United States Patent
Khlat et al.

(10) Patent No.: US 9,722,639 B2
(45) Date of Patent: Aug. 1, 2017

(54) CARRIER AGGREGATION ARRANGEMENTS FOR MOBILE DEVICES

(71) Applicant: RF Micro Devices, Inc., Greensboro, NC (US)

(72) Inventors: Nadim Khlat, Cugnaux (FR); Marcus Granger-Jones, Scotts Valley, CA (US)

(73) Assignee: Qorvo US, Inc., Greensboro, NC (US)

( * ) Notice: Subject to any disclaimer, the term of this patent is extended or adjusted under 35 U.S.C. 154(b) by 377 days.

(21) Appl. No.: 14/267,095

(22) Filed: May 1, 2014

(65) Prior Publication Data

US 2014/0328220 A1    Nov. 6, 2014

Related U.S. Application Data

(60) Provisional application No. 61/817,912, filed on May 1, 2013, provisional application No. 61/817,923, filed on May 1, 2013, provisional application No. 61/826,659, filed on May 23, 2013.

(51) Int. Cl.
*H04B 1/00* (2006.01)
*H04L 5/00* (2006.01)

(52) U.S. Cl.
CPC ............ *H04B 1/0064* (2013.01); *H04L 5/001* (2013.01); *H04L 5/0041* (2013.01)

(58) Field of Classification Search
None
See application file for complete search history.

(56) References Cited

U.S. PATENT DOCUMENTS

| | | |
|---|---|---|
| 4,902,992 A | 2/1990 | Rubin et al. |
| 5,774,193 A | 6/1998 | Vaughan |
| 6,710,813 B1 | 3/2004 | Grandchamp et al. |
| 6,980,067 B2 | 12/2005 | Forrester et al. |
| 7,035,602 B2 | 4/2006 | Satoh et al. |
| 7,376,440 B2 | 5/2008 | Forrester et al. |
| 7,546,091 B2 | 6/2009 | Murakami et al. |

(Continued)

OTHER PUBLICATIONS

Non-Final Office Action for U.S. Appl. No. 14/498,746, mailed Feb. 24, 2016, 11 pages.

(Continued)

*Primary Examiner* — Hassan Phillips
*Assistant Examiner* — Gautam Sharma
(74) *Attorney, Agent, or Firm* — Withrow & Terranova, P.L.L.C.

(57) ABSTRACT

Front end circuitry for a wireless communication system includes a first antenna node, a second antenna node, a first triplexer, a second triplexer, and front end switching circuitry coupled between the first triplexer, the second triplexer, the first antenna node, and the second antenna node. The front end switching circuitry is configured to selectively couple the first triplexer to one of the first antenna node and the second antenna node and couple the second triplexer to a different one of the first antenna node and the second antenna node. By using a first triplexer and a second triplexer in the mobile front end circuitry, the mobile front end circuitry may operate in one or more carrier aggregation configurations while reducing the maximum load presented to the first antenna node and the second antenna node, thereby improving the performance of the front end circuitry.

41 Claims, 12 Drawing Sheets

(56) References Cited

U.S. PATENT DOCUMENTS

| | | | |
|---|---|---|---|
| 8,149,742 B1 | 4/2012 | Sorsby | |
| 8,385,871 B2 | 2/2013 | Wyville | |
| 8,552,816 B2 | 10/2013 | Khlat | |
| 8,634,029 B2 | 1/2014 | Pugel | |
| 8,849,217 B2 | 9/2014 | Rousu et al. | |
| 8,892,057 B2 | 11/2014 | Khlat | |
| 8,903,409 B2 | 12/2014 | Winiecki et al. | |
| 9,118,376 B2 | 8/2015 | Khlat et al. | |
| 9,124,355 B2 | 9/2015 | Black et al. | |
| 2002/0053954 A1 | 5/2002 | Shamsaifar et al. | |
| 2002/0130734 A1 | 9/2002 | Liang et al. | |
| 2002/0137471 A1 | 9/2002 | Satoh et al. | |
| 2004/0189526 A1* | 9/2004 | Frank | H04B 1/0057 343/700 MS |
| 2005/0020297 A1* | 1/2005 | Axness | H04B 1/525 455/552.1 |
| 2005/0195047 A1* | 9/2005 | Park | H03H 9/706 333/133 |
| 2005/0239421 A1 | 10/2005 | Kim et al. | |
| 2006/0194550 A1 | 8/2006 | Block et al. | |
| 2007/0022460 A1* | 1/2007 | Kim | H04B 10/25758 725/128 |
| 2008/0240000 A1 | 10/2008 | Kidd | |
| 2009/0174622 A1* | 7/2009 | Kanou | H04B 1/0064 343/876 |
| 2010/0102899 A1 | 4/2010 | Engel | |
| 2010/0189031 A1* | 7/2010 | Kanou | H01Q 1/24 370/328 |
| 2011/0110452 A1* | 5/2011 | Fukamachi | H01P 1/20336 375/267 |
| 2013/0077540 A1 | 3/2013 | Black et al. | |
| 2013/0201880 A1 | 8/2013 | Bauder et al. | |
| 2013/0235806 A1* | 9/2013 | Nilsson | H01Q 1/246 370/328 |
| 2013/0244722 A1* | 9/2013 | Rousu | H04B 1/16 455/552.1 |
| 2014/0003300 A1* | 1/2014 | Weissman | H04B 7/0404 370/273 |
| 2014/0185498 A1 | 7/2014 | Schwent et al. | |
| 2014/0192845 A1* | 7/2014 | Szini | H04B 7/0413 375/219 |
| 2014/0269853 A1 | 9/2014 | Gudem et al. | |
| 2014/0328220 A1* | 11/2014 | Khlat | H04L 5/1461 370/278 |
| 2015/0017993 A1 | 1/2015 | Ishii | |

OTHER PUBLICATIONS

Final Office Action for U.S. Appl. No. 14/498,991, mailed Feb. 3, 2016, 14 pages.
Non-Final Office Action for U.S. Appl. No. 14/497,919, mailed Mar. 10, 2016, 21 pages.
Non-Final Office Action for U.S. Appl. No. 14/498,991, mailed Aug. 17, 2015, 13 pages.
Notice of Allowance for U.S. Appl. No. 14/282,393, mailed Aug. 19, 2015, 8 pages.
Notice of Allowance for U.S. Appl. No. 14/302,500, mailed Oct. 23, 2015, 8 pages.
Final Office Action for U.S. Appl. No. 14/498,746, mailed Aug. 5, 2016, 12 pages.
Non-Final Office Action for U.S. Appl. No. 14/659,314, mailed Sep. 19, 2016, 15 pages.
Final Office Action for U.S. Appl. No. 14/497,919, mailed Sep. 22, 2016, 26 pages.
Non-Final Office Action for U.S. Appl. No. 14/498,991, mailed May 2, 2016, 14 pages.
Final Office Action for U.S. Appl. No. 14/498,991, mailed Sep. 30, 2016, 15 pages.
Notice of Allowance for U.S. Appl. No. 14/498,746, mailed Nov. 15, 2016, 8 pages.
Frenzel, Lou, "Understanding Solutions for the Crowded Electromagnetic Frequency Spectrum," Electronic Design, Mar. 21, 2012, Penton, 16 pages, http://electronicdesign.com/communications/understanding-solutions-crowded-electromagnetic-frequency-spectrum.
Non-Final Office Action for U.S. Appl. No. 14/673,192, mailed Dec. 15, 2016, 9 pages.
Advisory Action for U.S. Appl. No. 14/498,991, mailed Jan. 3, 2017, 3 pages.
Non-Final Office Action for U.S. Appl. No. 14/498,991, dated Mar. 9, 2017, 14 pages.
Advisory Action for U.S. Appl. No. 14/497,919, dated Feb. 21, 2017, 3 pages.
Notice of Allowance for U.S. Appl. No. 14/659,314, dated Apr. 3, 2017, 8 pages.
Non-Final Office Action for U.S. Appl. No. 14/673,192, dated Apr. 14, 2017, 5 pages.
Non-Final Office Action for U.S. Appl. No. 14/497,919, dated May 12, 2017, 26 pages.

* cited by examiner

| OPERATING BAND | UPLINK (UL) OPERATING BAND | DOWNLINK (DL) OPERATING BAND | DUPLEX MODE |
|---|---|---|---|
| 1 | 1920-1980 | 2110-2170 | FDD |
| 2 | 1850-1910 | 1920-1990 | FDD |
| 3 | 1710-1785 | 1805-1880 | FDD |
| 4 | 1710-1755 | 2110-2155 | FDD |
| 5 | 824-849 | 869-894 | FDD |
| 6 | 830-840 | 865-875 | FDD |
| 7 | 2500-2570 | 2620-2690 | FDD |
| 8 | 880-915 | 925-960 | FDD |
| 9 | 1749.9-1784.9 | 1844.9-1879.9 | FDD |
| 10 | 1710-1770 | 2110-2170 | FDD |
| 11 | 1427.9-1447.9 | 1475.9-1495.9 | FDD |
| 12 | 698-716 | 728-746 | FDD |
| 13 | 777-787 | 746-756 | FDD |
| 14 | 788-798 | 758-768 | FDD |
| 15 | RESERVED | RESERVED | - |
| 16 | RESERVED | RESERVED | - |
| 17 | 704-716 | 734-746 | FDD |
| 18 | 815-830 | 860-875 | FDD |
| 19 | 830-845 | 875-890 | FDD |
| 20 | 832-862 | 791-821 | FDD |
| 21 | 1447.9-1462.9 | 1495.9-1510.9 | FDD |
| 22 | 3410-3500 | 3510-3600 | FDD |
| ... | ... | ... | ... |
| 33 | 1900-1920 | 1900-1920 | TDD |
| 34 | 2010-2025 | 2010-2025 | TDD |
| 35 | 1850-1910 | 1850-1910 | TDD |
| 36 | 1930-1990 | 1930-1990 | TDD |
| 37 | 1910-1930 | 1910-1930 | TDD |
| 38 | 2570-2620 | 2570-2620 | TDD |
| 39 | 1880-1920 | 1880-1920 | TDD |
| 40 | 2300-2400 | 2300-2400 | TDD |
| 41 | 3400-3600 | 3400-3600 | TDD |

*FIG. 1*
*(RELATED ART)*

CARRIER AGGREGATION ARRANGEMENTS FOR MOBILE DEVICES

RELATED APPLICATIONS

This application claims the benefit of U.S. provisional patent application Ser. No. 61/817,912, filed May 1, 2013, U.S. provisional patent application Ser. No. 61/817,923, filed May 1, 2013, and U.S. provisional patent application Ser. No. 61/826,659, filed May 23, 2013, the disclosures of which are incorporated herein by reference in their entireties.

FIELD OF THE DISCLOSURE

The present disclosure relates to front end circuitry for a wireless communication system capable of operating in one or more carrier aggregation configurations.

BACKGROUND

Modern mobile telecommunications standards continue to demand increasingly greater rates of data exchange (data rates). One way to increase the data rate of a mobile device is through the use of carrier aggregation. Carrier aggregation allows a single mobile device to aggregate bandwidth across one or more operating bands in the wireless spectrum. The increased bandwidth achieved as a result of carrier aggregation allows a mobile device to obtain higher data rates than have previously been available.

FIG. 1 shows a table describing a number of wireless communication operating bands in the wireless spectrum. One or more of the operating bands may be used, for example, in a Code Division Multiple Access (CDMA), Global System for Mobile Communications (GSM), Long Term Evolution (LTE), or LTE-advanced equipped mobile device. The first column indicates the operating band number for each one of the operating bands. The second and third columns indicate uplink and downlink frequency bands for each one of the operating bands, respectively. Finally, the fourth column indicates the duplex mode of each one of the operating bands. In non-carrier aggregation configurations, a mobile device will generally communicate using a single portion of the uplink or downlink frequency bands within a single operating band. In carrier aggregation applications, however, a mobile device may aggregate bandwidth across a single operating band or multiple operating bands in order to increase the data rate of the device.

FIG. 2A shows a diagram representing a conventional, non-carrier aggregation configuration for a mobile device. In this conventional configuration, the mobile device communicates using a single portion of the wireless spectrum 10 within a single operating band 12. Under the conventional approach, the data rate of the mobile device is constrained by the limited available bandwidth.

FIGS. 2B-2D show diagrams representing a variety of carrier aggregation configurations for a mobile device. FIG. 2B shows an example of contiguous intra-band carrier aggregation, in which the aggregated portions of the wireless spectrum 14A and 14B are located directly adjacent to one another and are in the same operating band 16. FIG. 2C shows an example of non-contiguous intra-band carrier aggregation, in which the aggregated portions of the wireless spectrum 18A and 18B are located within the same operating band 20, but are not directly adjacent to one another. Finally, FIG. 2D shows an example of inter-band carrier aggregation, in which the aggregated portions of the wireless spectrum 22A and 22B are located in different operating bands 24 and 26. A modern mobile device should be capable of supporting each one of the previously described carrier aggregation configurations.

FIG. 3 shows conventional front end circuitry 30 for a wireless communications system capable of operating in one or more carrier aggregation configurations. The conventional front end circuitry 30 includes a first antenna 32A, a second antenna 32B, a first diplexer 34A, a second diplexer 34B, front end switching circuitry 36, filtering circuitry 38, and transceiver circuitry 40. The transceiver circuitry 40 includes a first transceiver module 42A, a second transceiver module 42B, a first receiver module 44A, and a second receiver module 44B. As will be appreciated by those of ordinary skill in the art, the first transceiver module 42A and the first receiver module 44A may each be associated with a first operating band (hereinafter referred to as band A), such that the first transceiver module 42A is configured to support the transmission and reception of signals about band A, and the first receiver module 44A is configured to support the reception of signals about band A. Similarly, the second transceiver module 42B and the second receiver module 44B may each be associated with a second operating band (hereinafter referred to as band B), such that the second transceiver module 42B is configured to support the transmission and reception of signals about band B, and the second receiver module 44B is configured to support the reception of signals about band B.

The first transceiver module 42A includes a first power amplifier 46 and a first low noise amplifier (LNA) 48. The first transceiver module 42A is configured to receive band A baseband transmit signals at a band A transmit node TX_A, amplify the band A baseband transmit signals to a level appropriate for transmission from the first antenna 32A or the second antenna 32B using the first power amplifier 46, and deliver the amplified band A transmit signals to the front end switching circuitry 36 through the filtering circuitry 38. The first transceiver module 42A is further configured to receive band A receive signals at the first LNA 48 through the filtering circuitry 38, amplify the band A receive signals using the first LNA 48, and deliver the amplified band A receive signals to a band A receive node RX_A for further processing, for example, by baseband circuitry (not shown).

Similar to the first transceiver module 42A, the second transceiver module 42B includes a second power amplifier 50 and a second LNA 52. The second transceiver module 42B is configured to receive band B baseband transmit signals at a band B transmit node TX_B, amplify the band B baseband transmit signals to a level appropriate for transmission from one of the first antenna 32A and the second antenna 32B using the second power amplifier 50, and deliver the amplified band B transmit signals to the front end switching circuitry 36 through the filtering circuitry 38. The second transceiver module 42B is further configured to receive band B receive signals at the second LNA 52 through the filtering circuitry 38, amplify the band B receive signals using the second LNA 52, and deliver the amplified band B receive signals to a band B receive node RX_B for further processing, for example, by baseband circuitry (not shown).

As discussed above, the conventional front end circuitry 30 is configured to operate in one or more carrier aggregation modes of operation. Accordingly, the first receiver module 44A, the second receiver module 44B, and the filtering circuitry 38 are provided. The first receiver module 44A includes a first receiver LNA 54. The first receiver module 44A is configured to receive band A receive signals from the front end switching circuitry 36 at the first receiver LNA 54 through the filtering circuitry 38, amplify the band A receive signals using the first receiver LNA 54, and deliver the amplified band A receive signals to a second band A receive node RX_A1 for further processing, for example, by baseband circuitry (not shown). Similarly, the second receiver module 44B includes a second receiver LNA 56. The second receiver module 44B is configured to receive band B receive signals from the front end switching circuitry 36 at the second receiver LNA 56 through the filtering circuitry 38, amplify the band B receive signals using the second receiver LNA 56, and deliver the amplified band B receive signals to a second band B receive node RX_B1 for further processing, for example, by baseband circuitry (not shown).

The filtering circuitry 38 includes a quadplexer 58 and a duplexer 60. The quadplexer 58 passes band A transmit signals between the first power amplifier 46 and the front end switching circuitry 36, passes band A receive signals between the front end switching circuitry 36 and the first LNA 48, passes band B transmit signals between the second power amplifier 50 and the front end switching circuitry 36, and passes band B receive signals between the front end switching circuitry 36 and the second LNA 52, while attenuating signals outside of the respective bands for each signal path. Similarly, the duplexer 60 passes band A receive signals between the front end switching circuitry 36 and the first receiver LNA 54 and passes band B receive signals between the front end switching circuitry 36 and the second receiver LNA 56, while attenuating signals outside of the respective bands for each signal path.

The front end switching circuitry 36 includes band selection circuitry 62, antenna swapping circuitry 64, and switching control circuitry 66. The band selection circuitry 62 includes low-band selection circuitry 68 and mid/high-band selection circuitry 70 for each one of the first antenna 32A and the second antenna 32B. Specifically, the band selection circuitry 62 includes first low-band band selection circuitry 68A coupled to the first antenna 32A through the first diplexer 34A, first mid/high-band selection circuitry 70A coupled to the first antenna 32A through the first diplexer 34A, second low-band selection circuitry 68B coupled to the second antenna 32B through the second diplexer 34B, and second mid/high-band selection circuitry 70B coupled to the second antenna 32B through the second diplexer 34B. Each one of the diplexers 34 are configured to pass low-band signals between the connected low-band selection circuitry 68 and the connected one of the antennas 32, pass mid/high-band signals between the connected mid/high-band selection circuitry 70 and the connected one of the antennas 32, and attenuate signals outside of the respective low and mid/high bands while providing isolation between the connected low-band selection circuitry 68 and the connected mid/high-band selection circuitry 70. The band selection circuitry 62 is configured to place one or more modules in the transceiver circuitry 40 in contact with the first antenna 32A or the second antenna 32B in order to transmit and receive signals about the operating bands associated with the one or more transceiver modules.

The antenna swapping circuitry 64 is coupled between the filtering circuitry 38 and the band selection circuitry 62, and is configured to swap the antenna presented to the quadplexer 58 and the duplexer 60. As will be appreciated by those of ordinary skill in the art, the antenna swapping circuitry 64 may swap antennas between the quadplexer 58 and the duplexer 60 in order ensure that signals are transmitted from either the first transceiver module 42A or the second transceiver module 42B using the one of the antennas 32 with the most favorable transmission characteristics at the time.

The switching control circuitry 66 operates the band selection circuitry 62 and the antenna swapping circuitry 64. In a first operating mode of the front end switching circuitry 36, the switching control circuitry 66 operates the band selection circuitry 62 and the antenna swapping circuitry 64 to place the first transceiver module 42A and the second transceiver module 42B in contact with the first antenna 32A through the quadplexer 58, and place the first receiver module 44A and the second receiver module 44B in contact with the second antenna 32B through the duplexer 60. In this configuration, the conventional front end circuitry 30 may simultaneously transmit band A signals while receiving band A signals and band B signals from the first antenna 32A, and simultaneously receive band A signals and band B signals from the second antenna 32B. Alternatively in this configuration, the conventional front end circuitry 30 may simultaneously transmit band B signals while receiving band A and band B signals from the first antenna 32A, and simultaneously receive band A signals and band B signals from the second antenna 32B.

In a second operating mode of the front end switching circuitry 36, the switching control circuitry 66 operates the band selection circuitry 62 and the antenna swapping circuitry 64 to place the first transceiver module 42A and the second transceiver module 42B in contact with the second antenna 32B through the quadplexer 58, and place the first receiver module 44A and the second receiver module 44B in contact with the first antenna 32A through the duplexer 60. In this configuration, the conventional front end circuitry 30 may simultaneously transmit band A signals while receiving band A signals and band B signals from the second antenna 32B, and simultaneously receive band A signals and band B signals from the first antenna 32A. Alternatively in this configuration, the conventional front end circuitry 30 may simultaneously transmit band B signals while receiving band A signals and band B signals from the second antenna 32B, while receiving band A signals and band B signals from the first antenna 32A.

Although capable of operating in one or more carrier aggregation configurations, the conventional front end circuitry 30 generally suffers from poor efficiency. As discussed above, both the first transceiver module 42A and the second transceiver module 42B are connected to either the first antenna 32A or the second antenna 32B, depending on which antenna is used for the transmission of signals, at any given time. Accordingly, at least one of the first antenna 32A or the second antenna 32B is always loaded by at least the quadplexer 58. The relatively large load associated with the quadplexer 58 results in excessive insertion loss in the conventional front end circuitry 30, thereby degrading the efficiency of a mobile terminal in which the conventional front end circuitry 30 is incorporated. Accordingly, there is a need for front end circuitry that is capable of operating in a variety of carrier aggregation configurations while also maintaining the efficiency and performance of the front end circuitry.

SUMMARY

Front end circuitry for a wireless communications system includes a first antenna node, a second antenna node, a first triplexer, a second triplexer, and front end switching circuitry coupled between the first triplexer, the second triplexer, the first antenna node, and the second antenna node.

The front end switching circuitry is configured to selectively couple the first triplexer to one of the first antenna node and the second antenna node and selectively couple the second triplexer to a different one of the first antenna node and the second antenna node. By using a first triplexer and a second triplexer in the front end circuitry, the front end circuitry may operate in one or more carrier aggregation configurations while reducing the maximum load presented to the first antenna node and the second antenna node, thereby improving the performance of the front end circuitry.

In one embodiment, each one of the first triplexer and the second triplexer includes a first triplexer node, a second triplexer node, a third triplexer node, and a common triplexer node. A coupling diplexer is coupled to the common triplexer node. A duplexer is coupled between the first triplexer node, the second triplexer node, and the diplexer. A receiver filter is coupled between the third triplexer node and the diplexer, such that the coupling diplexer couples the duplexer and the receiver filter to the common node.

In one embodiment, each one of the first triplexer and the second triplexer includes a first triplexer node, a second triplexer node, a third triplexer node, and a common triplexer node. A duplexer is coupled in series with a phase shifter between the first triplexer node, the second triplexer node, and the common triplexer node, such that the duplexer is connected to the triplexer common node through the phase shifter. A receiver filter is coupled in series with a receiver phase shifter between the third triplexer node and the common triplexer node, such that the receiver filter is connected to the triplexer common node through the receiver phase shifter.

In one embodiment, the first triplexer is configured to pass transmit signals about a first operating band between the first triplexer node and the common triplexer node, pass receive signals about the first operating band between the common triplexer node and the second triplexer node, and pass receive signals about a second operating band between the common triplexer node and a third triplexer node, while attenuating signals outside of the respective bands of the signal paths.

In one embodiment, the second triplexer is configured to pass transmit signals about the second operating band between a first triplexer node and the common triplexer node, pass receive signals about the second operating band between the common triplexer node and the second triplexer node, and pass receive signals about the first operating band between the common triplexer node and the third triplexer node, while attenuating signals outside of the respective bands of the signal paths.

In one embodiment, the first triplexer and the second triplexer are configured to operate in a band-sharing configuration, such that the first triplexer is further configured to pass receive signals about a third operating band between the common triplexer node and the third triplexer node, and the second triplexer is further configured to pass receive signals about the third operating band between the common triplexer node and the second triplexer node, and pass transmit signals about the third operating band between the third triplexer node and the common triplexer node.

In one embodiment, front end circuitry for a wireless communications system includes a first antenna node, a second antenna node, a plurality of duplexers, a plurality of receiver filters, and front end switching circuitry coupled between the first antenna node, the second antenna node, the plurality of duplexers, and the plurality of receiver filters. The front end switching circuitry is configured to selectively couple a first one of the plurality of duplexers and a first one of the plurality of receiver filters to one of the first antenna node and the second antenna node, and selectively couple a second one of the plurality of duplexers and a second one of the plurality of receiver filters to a different one of the first antenna node and the second antenna node. Accordingly, a first triplexer is effectively coupled to the first antenna node, and a second triplexer is effectively coupled to the second antenna node. By using a first triplexer and a second triplexer in the front end circuitry, the front end circuitry may operate in one or more carrier aggregation configurations while reducing the maximum load presented to the first antenna node and the second antenna node, thereby improving the performance of the front end circuitry.

Those skilled in the art will appreciate the scope of the disclosure and realize additional aspects thereof after reading the following detailed description in association with the accompanying drawings.

BRIEF DESCRIPTION OF THE DRAWINGS

The accompanying drawings incorporated in and forming a part of this specification illustrate several aspects of the disclosure, and together with the description serve to explain the principles of the disclosure.

FIG. 1 is a table describing a number of wireless communication operating bands in the wireless spectrum.

DETAILED DESCRIPTION

The embodiments set forth below represent the necessary information to enable those skilled in the art to practice the disclosure and illustrate the best mode of practicing the disclosure. Upon reading the following description in light of the accompanying drawings, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Figure 2A:
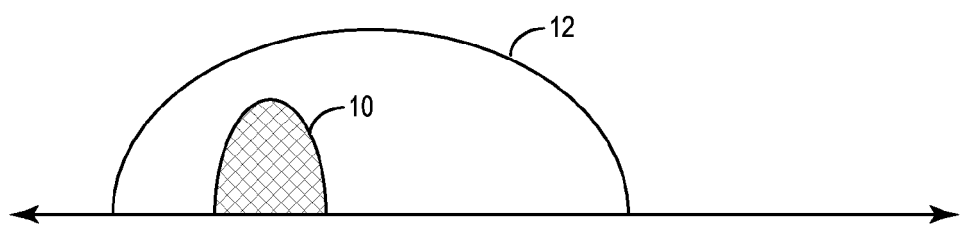
FIGS. 2A-2D are diagrams representing a number of carrier aggregation configurations for a mobile device.
Figure 2B:
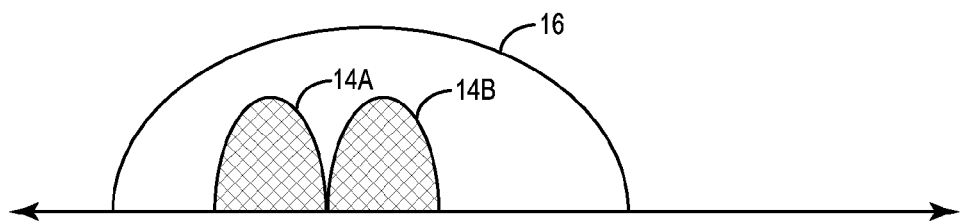
Figure 2C:
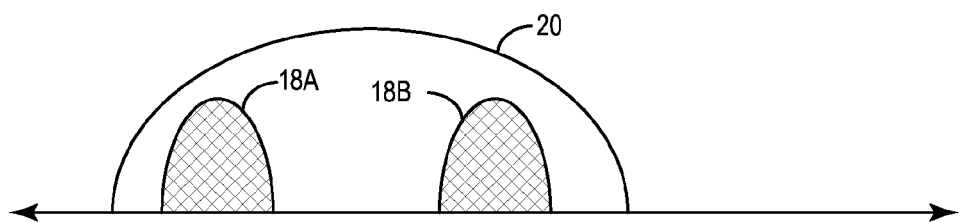
Figure 2D:
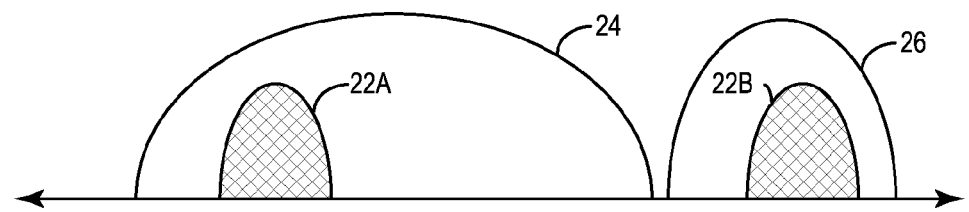
Figure 3:
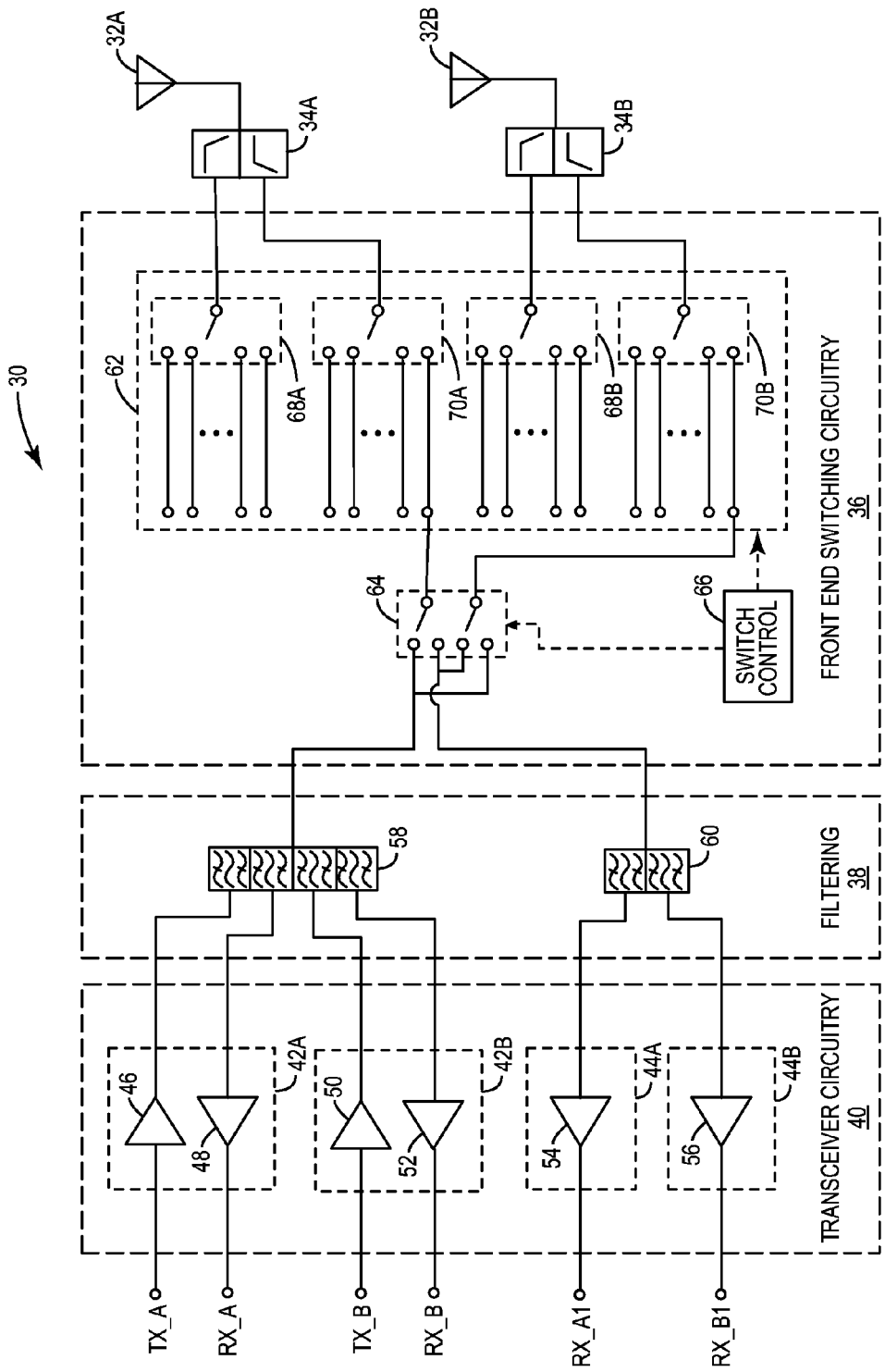
FIG. 3 is a schematic representation of conventional front end circuitry capable of operating in one or more carrier aggregation configurations.
Figure 4:
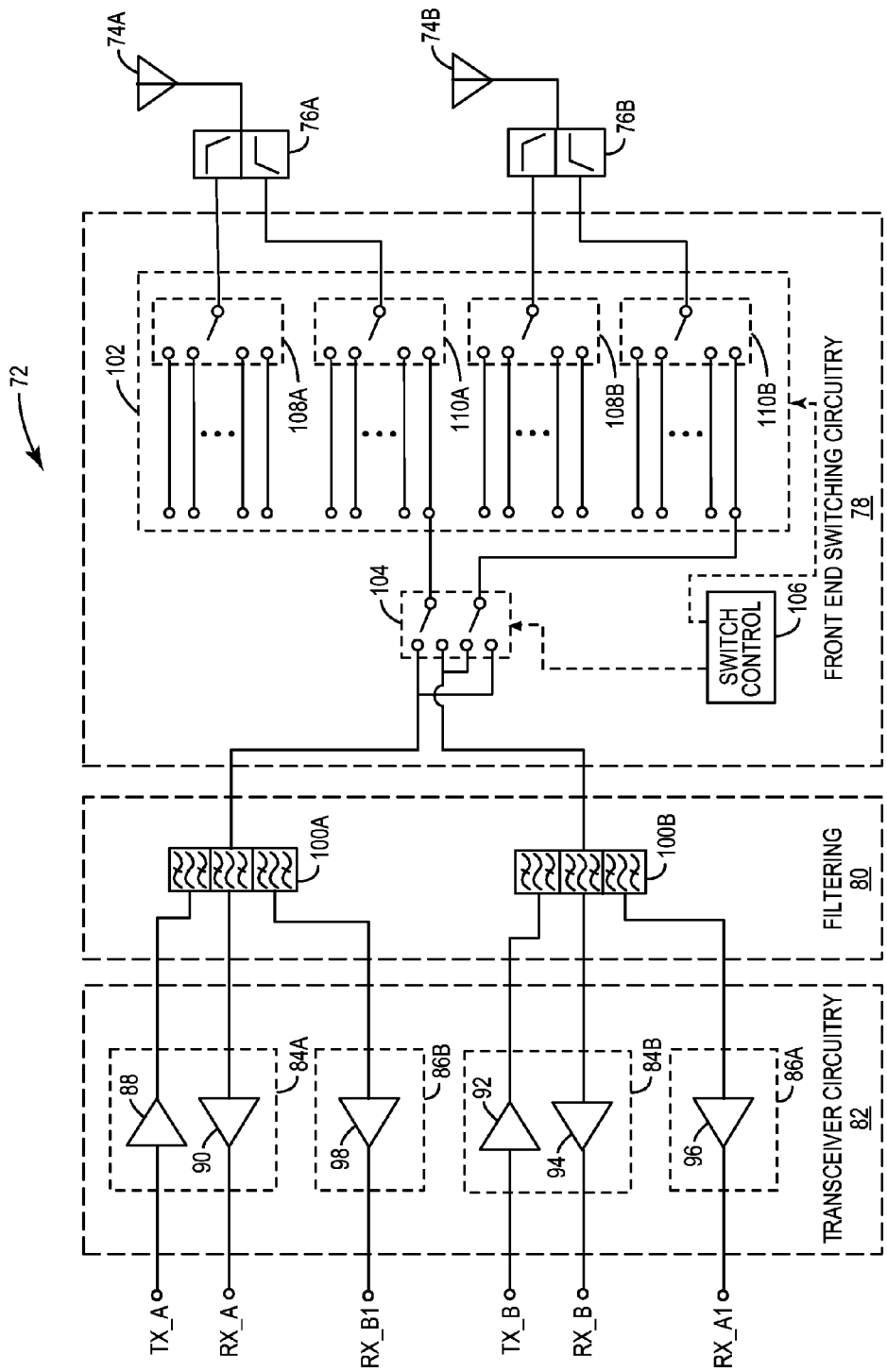
FIG. 4 is a schematic representation of front end circuitry capable of operating in one or more carrier aggregation configurations according to one embodiment of the present disclosure.

Turning now to FIG. 4, front end circuitry 72 for a wireless communications system is shown according to one embodiment of the present disclosure. The front end circuitry 72 includes a first antenna 74A, a second antenna 74B, a first diplexer 76A, a second diplexer 76B, front end switching circuitry 78, filtering circuitry 80, and transceiver circuitry 82. The transceiver circuitry 82 includes a first transceiver module 84A, a second transceiver module 84B, a first receiver module 86A, and a second receiver module 86B. As will be appreciated by those of ordinary skill in the art, the first transceiver module 84A and the first receiver module 86A may each be associated with a first operating band (hereinafter referred to as band A), such that the first transceiver module 84A is configured to support the transmission and reception of signals about band A, and the first receiver module 86A is configured to support the reception of signals about band A. Similarly, the second transceiver module 84B and the second receiver module 86B may each be associated with a second operating band (hereinafter referred to as band B), such that the second transceiver module 84B is configured to support the transmission and reception of signals about band B, and the second receiver module 86B is configured to support the reception of signals about band B.

The first transceiver module 84A may include a first power amplifier 88 and a first low noise amplifier (LNA) 90. The first transceiver module 84A may be configured to receive band A baseband transmit signals at a band A transmit node TX_A, amplify the band A baseband transmit signals to a level appropriate for transmission from the first antenna 74A or the second antenna 74B using the first power amplifier 88, and deliver the amplified band A transmit signals to the front end switching circuitry 78 through the filtering circuitry 80. The first transceiver module 84A may be further configured to receive band A receive signals at the first LNA 90 through the filtering circuitry 80, amplify the band A receive signals using the first LNA 90, and deliver the amplified band A receive signals to a band A receive node RX_A for further processing, for example, by baseband circuitry (not shown).

Similar to the first transceiver module 84A, the second transceiver module 84B includes a second power amplifier 92 and a second LNA 94. The second transceiver module 84B may be configured to receive band B baseband transmit signals at a band B transmit node TX_B, amplify the band B baseband transmit signals to a level appropriate for transmission from one of the first antenna 74A and the second antenna 74B using the second power amplifier 92, and deliver the amplified band B transmit signals to the front end switching circuitry 78 through the filtering circuitry 80. The second transceiver module 84B may be further configured to receive band B receive signals at the second LNA 94 through the filtering circuitry 80, amplify the band B receive signals using the second LNA 94, and deliver the amplified band B receive signals to a band B receive node RX_B for further processing, for example, by baseband circuitry (not shown).

The front end circuitry 72 may be configured to operate in one or more carrier aggregation modes of operation. Accordingly, the first receiver module 86A, the second receiver module 86B, and the filtering circuitry 80 are provided. The first receiver module 86A may include a first receiver LNA 96. The first receiver module 86A may be configured to receive band A receive signals from the front end switching circuitry 78 at the first receiver LNA 96 through the filtering circuitry 80, amplify the band A receive signals using the first receiver LNA 96, and deliver the amplified band A receive signals to a second band A receive node RX_A1 for further processing, for example, by baseband circuitry (not shown). Similarly, the second receiver module 86B may include a second receiver LNA 98. The second receiver module 86B may be configured to receive band B receive signals from the front end switching circuitry 78 at the second receiver LNA 98 through the filtering circuitry 80, amplify the band B receive signals using the second receiver LNA 98, and deliver the amplified band B receive signals to a second band B receive node RX_B1 for further processing, for example, by baseband circuitry (not shown).

The filtering circuitry 80 may include a first triplexer 100A and a second triplexer 100B. The first triplexer 100A separates band A transmit signals, band A receive signals, and band B receive signals, and provides isolation between the first power amplifier 88, the first LNA 90, and the second receiver LNA 98. Similarly, the second triplexer 100B separates band B transmit signals, band B receive signals, and band A receive signals, and provides isolation between the second power amplifier 92, the second LNA 94, and the first receiver LNA 96.

Specifically, the first triplexer 100A may be configured to pass band A transmit signals between the first power amplifier 88 and the front end switching circuitry 78, pass band A receive signals from the front end switching circuitry 78 to the first LNA 90, and pass band B receive signals from the front end switching circuitry 78 to the second receiver LNA 98, while attenuating signals outside of the respective bands of the signal paths. Similarly, the second triplexer 100B may be configured to pass band B transmit signals between the second power amplifier 92 and the front end switching circuitry 78, pass band B receive signals from the front end switching circuitry 78 to the second LNA 94, and pass band A receive signals from the front end switching circuitry 78 to the first receiver LNA 96, while attenuating signals outside of the respective bands of the signal paths.

The front end switching circuitry 78 may include band selection circuitry 102, antenna swapping circuitry 104, and switching control circuitry 106. The band selection circuitry 102 may include low-band selection circuitry 108 and mid/high-band selection circuitry 110 for each one of the first antenna 74A and the second antenna 74B. Specifically, the band selection circuitry 102 may include first low-band selection circuitry 108A coupled to the first antenna 74A through the first diplexer 76A, first mid/high-band selection circuitry 110A coupled to the first antenna 74A through the first diplexer 76A, second low-band selection circuitry 108B coupled to the second antenna 74B through the second diplexer 76B, and second mid/high-band selection circuitry 110B coupled to the second antenna 74B through the second diplexer 76B. Each one of the diplexers 76 may be configured to pass low-band signals between the connected low-band selection circuitry 108 and the connected one of the antennas 74, pass mid/high-band signals between the connected mid/high-band selection circuitry 110 and the connected one of the antennas 74, and attenuate signals outside of the respective low and mid/high bands while providing isolation between the connected low-band selection circuitry 108 and the connected mid/high-band selection circuitry 110. The band selection circuitry 102 may be configured to place one or more modules in the transceiver circuitry 82 in contact with the first antenna 74A or the second antenna 74B in order to transmit and receive signals about the operating bands associated with the one or more transceiver modules.

The antenna swapping circuitry 104 may be coupled between the filtering circuitry 80 and the band selection circuitry 102, and may be configured to swap the antenna presented to the first triplexer 100A and the second triplexer 100B. As will be appreciated by those of ordinary skill in the art, the antenna swapping circuitry 104 may swap antennas between the first triplexer 100A and the second triplexer 100B in order to ensure that signals are transmitted from either the first transceiver module 84A or the second transceiver module 84B using the one of the antennas 74 with the most favorable transmission characteristics at the time.

The switching control circuitry 106 may operate the band selection circuitry 102 and the antenna swapping circuitry 104. In a first operating mode of the front end switching circuitry 78, the switching control circuitry 106 may operate the band selection circuitry 102 and the antenna swapping circuitry 104 to place the first transceiver module 84A and the second receiver module 86B in contact with the first antenna 74A through the first triplexer 100A, and place the second transceiver module 84B and the first receiver module 86A in contact with the second antenna 74B through the second triplexer 100B. In this configuration, the front end circuitry 72 may simultaneously transmit band A signals while receiving band A signals and band B signals from the first antenna 74A, and simultaneously receive band A signals and band B signals from the second antenna 74B. Alternatively in this configuration, the front end circuitry 72 may simultaneously transmit band B signals while receiving band A signals and band B signals from the second antenna 74B, and simultaneously receive band A signals and band B signals from the first antenna 74A.

In a second operating mode of the front end switching circuitry 78, the switching control circuitry 106 may operate the band selection circuitry 102 and the antenna swapping circuitry 104 to place the first transceiver module 84A and the second receiver module 86B in contact with the second antenna 74B through the first triplexer 100A, and place the second transceiver module 84B and the first receiver module 86A in contact with the first antenna 74A through the second triplexer 100B. In this configuration, the front end circuitry 72 may simultaneously transmit band A signals while receiving band A signals and band B signals from the second antenna 74B, and simultaneously receive band A signals and band B signals from the first antenna 74A. Alternatively in this configuration, the front end circuitry 72 may simultaneously transmit band B signals while receiving band A signals and band B signals from the first antenna 74A, and simultaneously receive band A signals and band B signals from the second antenna 74B.

By using the first triplexer 100A and the second triplexer 100B to isolate the signal paths to the transceiver circuitry 82, the front end circuitry 72 may support one or more carrier aggregation configurations while also reducing the load connected to the one of the antennas 74 used for transmission of signals. That is, the load seen by the one of the antennas 74 used for transmission of signals in the front end circuitry 72 is limited to the load provided by either the first triplexer 100A or the second triplexer 100B, which is substantially lower than the load provided by a quadplexer, as used in conventional front end solutions. Accordingly, the performance of the front end circuitry 72 is improved.

The front end circuitry 72 may operate in a variety of carrier aggregation configurations. For example, the front end circuitry 72 may operate in a mid-band/mid-band carrier aggregation configuration, in which band A and band B are different mid-band operating bands with a transmit and receive frequency range within the mid-band frequency range of about 1.7 GHz to 2.2 GHz. As an additional example, the front end circuitry 72 may operate in a mid-band/high-band carrier aggregation configuration, in which band A is a mid-band operating band with a transmit and receive frequency range within the mid-band frequency range of about 1.7 GHz to 2.2 GHz and band B is a high-band operating band with a transmit and receive frequency within the high-band frequency range of about 2.3 to 2.5 GHz. Alternatively, the front end circuitry 72 may operate in a high-band/high-band carrier aggregation configuration, in which band A and band B are different high-band operating bands with a transmit and receive frequency range within the high-band frequency range of about 2.3 GHz to 2.5 GHz.

As a specific example, the front end circuitry 72 may operate in a band 3/band 7 carrier aggregation configuration, in which band A is band 3, with a transmit frequency range of about 1710 MHz to 1785 MHz and a receive frequency range of about 1805 MHz to 1880 MHz and band B is band 7, with a transmit frequency range of about 2500 MHz to 2570 MHz, and a receive frequency range of about 2620 MHz to 2690 MHz.

Although the front end switching circuitry 78 is shown in a particular configuration for purposes of illustration, those of ordinary skill in the art will appreciate that a variety of configurations for the front end switching circuitry 78 may be used without departing from the principles of the present disclosure. For example, the band selection circuitry 102, the antenna swapping circuitry 104, or both, may include more or less switching elements, and may be arranged in alternative configurations without departing from the principles of the present disclosure. Further, although only two transceiver modules 84 and two receiver modules 86 are shown in the transceiver circuitry 82 for purposes of illustration, those of ordinary skill in the art will appreciate that additional transceiver modules, additional receiver modules, and other additional circuitry may be included in the transceiver circuitry 82 without departing from the principles of the present disclosure.

Figure 5:
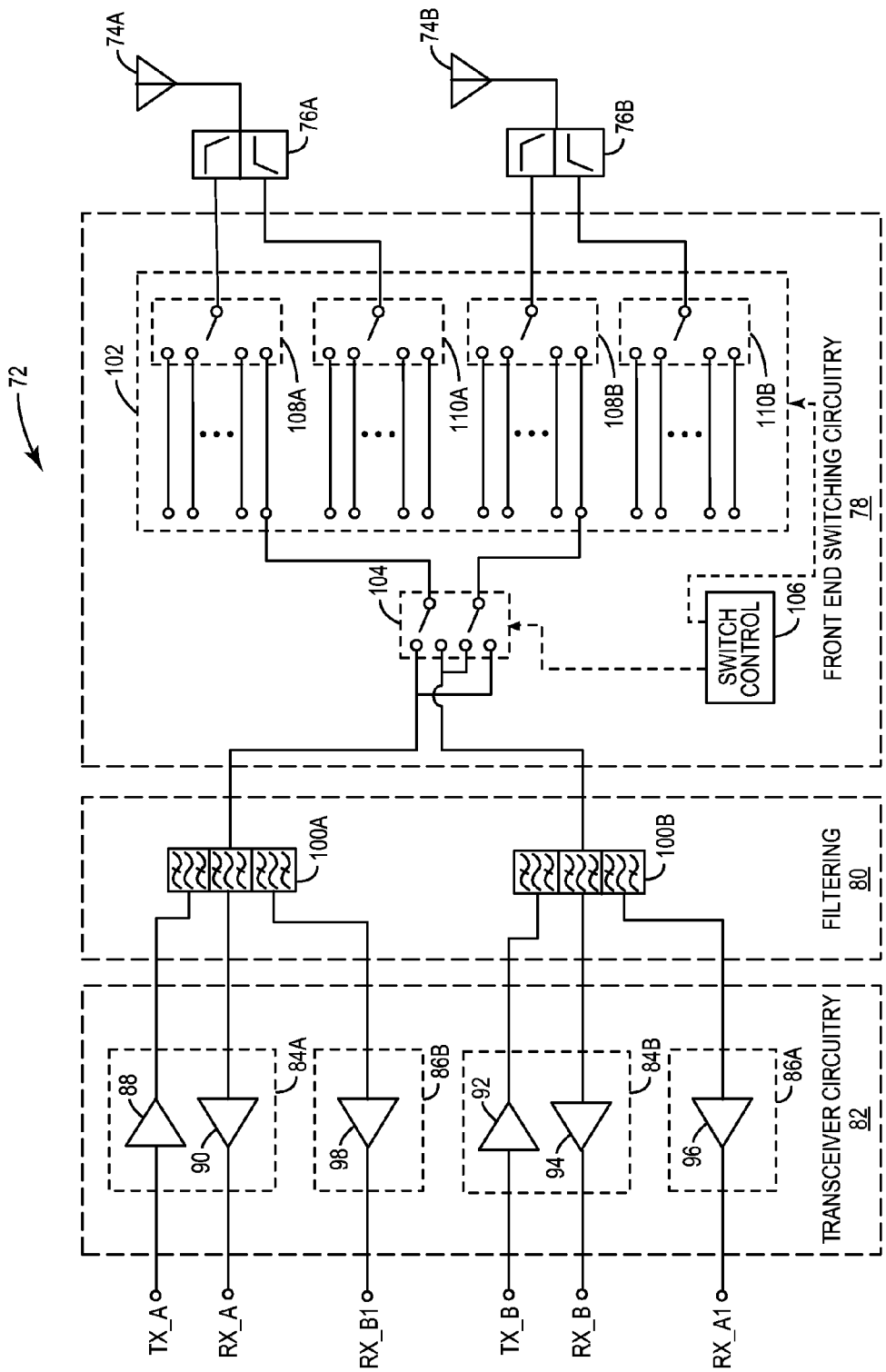
FIG. 5 is a schematic representation of the front end circuitry shown in FIG. 4 according to an additional embodiment of the present disclosure.

FIG. 5 shows the front end circuitry 72 according to an additional embodiment of the present disclosure. The front end circuitry 72 shown in FIG. 5 is substantially similar to that shown in FIG. 4, except that while the antenna swapping circuitry 104 in FIG. 4 is connected to the mid/high-band selection circuitry 110 in the band selection circuitry 102, the antenna swapping circuitry 104 in FIG. 5 is connected to the low-band selection circuitry 108 in the band selection circuitry 102. Accordingly, the front end circuitry 72 shown in FIG. 5 may operate in a low-band/low-band carrier aggregation configuration, in which band A and band B are different low-band operating bands with a transmit and receive frequency range within the low-band frequency range of about 600 MHz to 1 GHz. In one embodiment, the antenna swapping circuitry 104 is connected to one of the antennas 74 via the associated low band selection circuitry 100 and the other one of the antennas 74 via the associated mid/high-band selection circuitry 108 in order to operate in a low-band/mid-band or low-band/high-band carrier aggregation configuration.

Figure 6A:
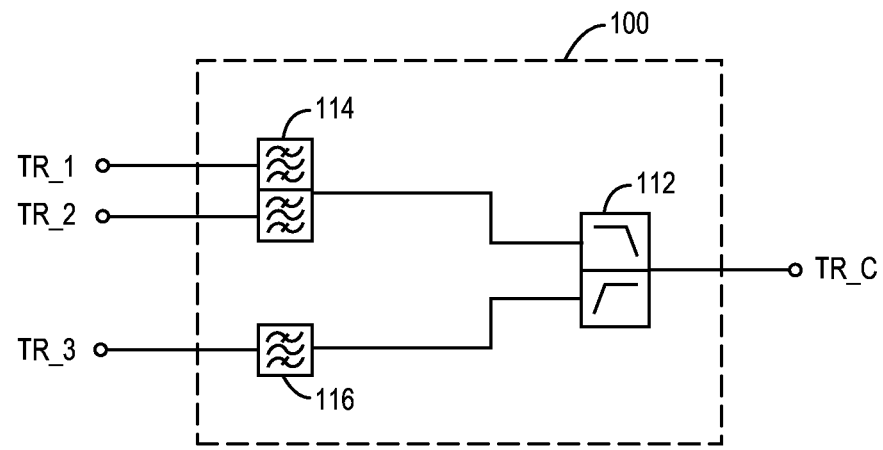
FIGS. 6A-6D are schematic representations illustrating the details of the triplexers shown in FIGS. 4 and 5 according to one embodiment of the present disclosure.

FIG. 6A shows details of the first triplexer 100A and the second triplexer 100B according to one embodiment of the present disclosure. As shown in FIG. 6A, the first triplexer 100A and the second triplexer 100B may each include a first triplexer node TR_1, a second triplexer node TR_2, a third triplexer node TR_3, and a triplexer common node TR_C. A coupling diplexer 112 may be coupled to the triplexer common node TR_C. A duplexer 114 may be coupled between the first triplexer node TR_1, the second triplexer node TR_2, and coupling diplexer 112, such that the duplexer 114 is coupled to the triplexer common node TR_C through the coupling diplexer 112. A receiver filter 116 may be coupled between the third triplexer node TR_3 and the coupling diplexer 112, such that the receiver filter is coupled to the triplexer common node TR_C through the coupling diplexer 112.

In operation, the duplexer 114 of the first triplexer 100A isolates band A transmit signals and band A receive signals, delivering band A transmit signals from the first triplexer node TR_1 to the coupling diplexer 112 and delivering band A receive signals from the coupling diplexer 112 to the second triplexer node TR_2, while attenuating signals outside of the bands of the respective signal paths. The receiver filter 116 of the first triplexer 100A isolates band B receive signals, delivering band B receive signals from the coupling diplexer 112 to the third triplexer node TR_3, while attenuating other signals. The coupling diplexer 112 provides isolation between the duplexer 114 and the receiver filter 116, such that the impedance seen between the duplexer 114 and the receiver filter 116 is substantially high. The first triplexer 100A is thus configured to pass transmit signals about band A between the first triplexer node TR_1 and the triplexer common node TR_C, pass receive signals about band A between the triplexer common node TR_C and the second triplexer node TR_2, and pass receive signals about band B between the triplexer common node TR_C and the third triplexer node TR_3, while attenuating signals outside of the bands of the respective signal paths.

The second triplexer 100B is substantially similar to the first triplexer 100A and operates in a substantially similar manner. However, the duplexer 114 of the second triplexer 100B isolates band B transmit signals and band B receive signals, delivering band B transmit signals from the first triplexer node TR_1 to the coupling diplexer 112 and delivering band B receive signals from the coupling diplexer 112 to the second triplexer node TR_2, while attenuating signals outside of the bands of the respective signal paths. The receiver filter 116 of the second triplexer 100B isolates band A receive signals, delivering band A receive signals from the coupling diplexer 112 to the third triplexer node TR_3, while attenuating other signals. The coupling diplexer 112 provides isolation between the duplexer 114 and the receiver filter 116, such that the impedance seen between the duplexer 114 and the receiver filter 116 is substantially high. The second triplexer is thus configured to pass transmit signals about band B between the first triplexer node TR_1 and the triplexer common node TR_C, pass receive signals about band B between the triplexer common node TR_C and the second triplexer node TR_2, and pass receive signals about band A between the triplexer common node TR_C and the third triplexer node TR_3, while attenuating signals outside of the bands of the respective signal paths.

In some embodiments, additional isolation may be provided between the duplexer 114 and the receiver filter 116 externally by one or more switches in the front end switching circuitry 78. For example, one or more switches in the front end switching circuitry 78 may act as a rudimentary phase shifter, which is coupled between the duplexer 114 and the receiver filter 116. Strategically using one or more switches in the front end circuitry 78 to provide isolation between the duplexer 114 and the receiver filter 116 allows for a reduction in area and complexity of the front end circuitry 72.

Figure 6B:
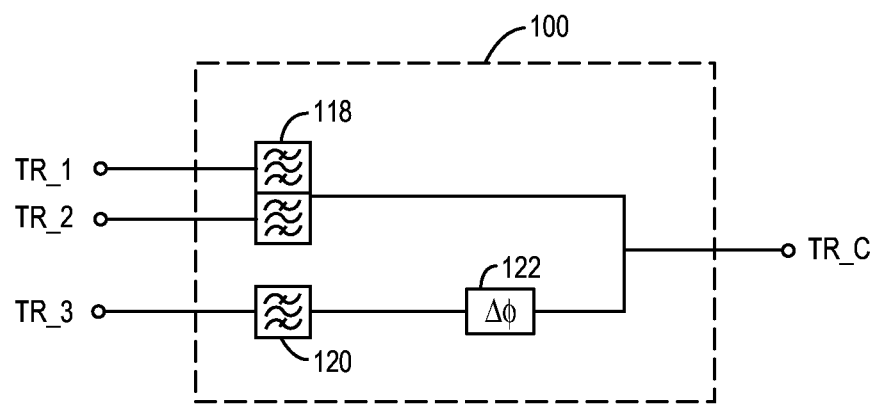

FIG. 6B shows details of the first triplexer 100A and the second triplexer 100B according to an additional embodiment of the present disclosure. As shown in FIG. 6B, the first triplexer 100A and the second triplexer 100B may each include a first triplexer node TR_1, a second triplexer node TR_2, a third triplexer node TR_3, and a triplexer common node TR_C. A duplexer 118 may be coupled between the first triplexer node TR_1, the second triplexer node TR_2, and the triplexer common node TR_C. A receiver filter 120 may be coupled in series with a coupling phase shifter 122 between the third triplexer node TR_3 and the triplexer common node TR_C.

In operation, the duplexer 118 of the first triplexer 100A isolates band A transmit signals and band A receive signals, delivering band A transmit signals from the first triplexer node TR_1 to the triplexer common node TR_C and delivering band A receive signals from the triplexer common node TR_C to the second triplexer node TR_2, while attenuating signals outside of the bands of the respective signal paths. The receiver filter 120 of the first triplexer 100A isolates band B receive signals, delivering band B receive signals from the coupling phase shifter 122 to the third triplexer node TR_3, while attenuating other signals. The coupling phase shifter 122 provides isolation between the duplexer 118 and the receiver filter 120, such that the impedance seen between the duplexer 118 and the receiver filter 120 is substantially high. The first triplexer 100A is thus configured to pass transmit signals about band A between the first triplexer node TR_1 and the triplexer common node TR_C, pass receive signals about band A between the triplexer common node TR_C and the second triplexer node TR_2, and pass receive signals about band B between the triplexer common node TR_C and the third triplexer node TR_3, while attenuating signals outside of the bands of the respective signal paths.

The second triplexer 100B is substantially similar to the first triplexer 100A and operates in a substantially similar manner. However, the duplexer 118 of the second triplexer 100B isolates band B transmit signals and band B receive signals, delivering band B transmit signals from the first triplexer node TR_1 to the triplexer common node TR_C and delivering band B receive signals from the triplexer common node TR_C to the second triplexer node TR_2, while attenuating signals outside of the bands of the respective signal paths. The receiver filter 120 of the second triplexer 100B isolates band A receive signals, delivering band A receive signals from the coupling phase shifter 122 to the third triplexer node TR_3, while attenuating other signals. The coupling phase shifter 122 provides isolation between the duplexer 118 and the receiver filter 120, such that the impedance seen between the duplexer 118 and the receiver filter 120 is substantially high. The second triplexer 100B is thus configured to pass transmit signals about band B between the first triplexer node TR_1 and the triplexer common node TR_C, pass receive signals about band B between the triplexer common node TR_C and the second triplexer node TR_2, and pass receive signals about band A between the triplexer common node TR_C and the third triplexer node TR_3, while attenuating signals outside of the bands of the respective signal paths.

In some embodiments, additional isolation may be provided between the duplexer 118 and the receiver filter 120 externally by one or more switches in the front end switching circuitry 78. For example, one or more switches in the front end switching circuitry 78 may act as a rudimentary phase shifter, which is coupled between the duplexer 118 and the receiver filter 120. Strategically using one or more switches in the front end circuitry 78 to provide isolation between the duplexer 118 and the receiver filter 120 allows for a reduction in area and complexity of the front end circuitry 72.

Figure 6C:
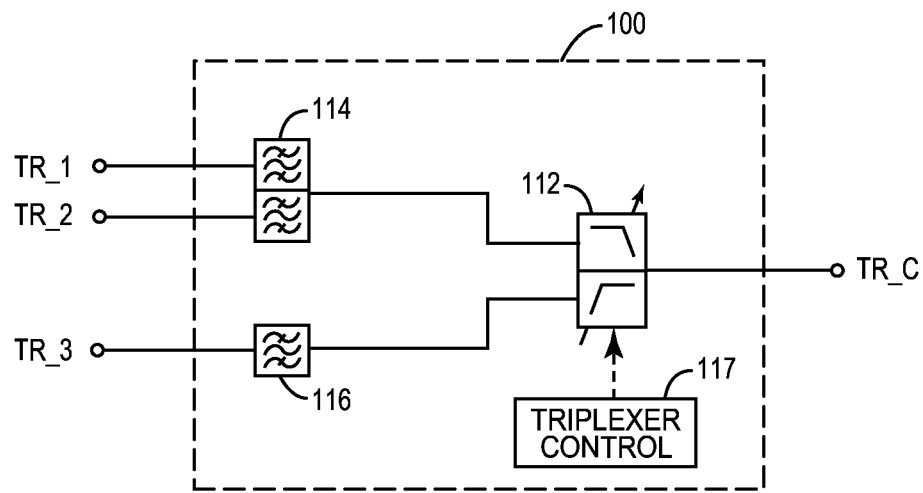

FIG. 6C shows details of the first triplexer 100A and the second triplexer 100B according to an additional embodiment of the present disclosure. The details of the first triplexer 100A and the second triplexer 100B shown in FIG. 6C are substantially similar to those shown in FIG. 6A, except that the coupling diplexer 112 shown in FIG. 6C is tunable. Further, triplexer control circuitry 117 is included for tuning the filter response of the coupling diplexer 112. Making the coupling diplexer 112 of the first triplexer 100A and the second triplexer 100B tunable allows the coupling diplexer 112 to be tuned in order to maximize isolation between the duplexer 114 and the receiver filter 116, even as conditions in the front end circuitry 72 change.

Figure 6D:
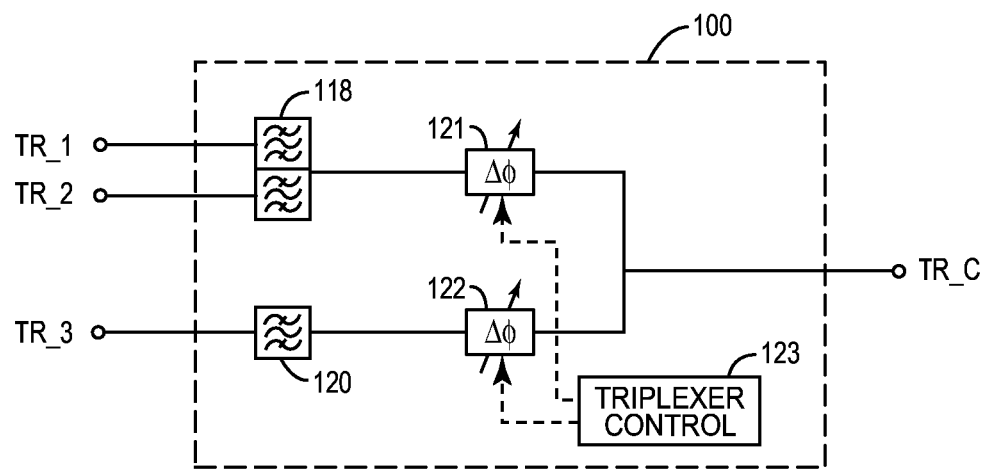

FIG. 6D shows details of the first triplexer 100A and the second triplexer 100B according to an additional embodiment of the present disclosure. The details of the first triplexer 100A and the second triplexer 100B shown in FIG. 6D are substantially similar to those shown in FIG. 6B, except for an additional coupling phase shifter 121 included in FIG. 6D. The additional coupling phase shifter 121 is coupled between the triplexer common node TR_C and the duplexer 118. Further, the additional coupling phase shifter 121 and the coupling phase shifter 122 are tunable. Triplexer control circuitry 123 is included for tuning the response of the additional coupling phase shifter 121 and the coupling phase shifter 122. Including the additional coupling phase shifter 121 in the first triplexer 100A and the second triplexer 100B allows for additional isolation between the duplexer 118 and the receiver filter 120. Further, making the additional coupling phase shifter 121 and the coupling phase shifter 122 tunable allows the front end circuitry 72 to maximize isolation between the duplexer 118 and the receiver filter 120, even as conditions in the front end circuitry 72 change.

Figure 7A:
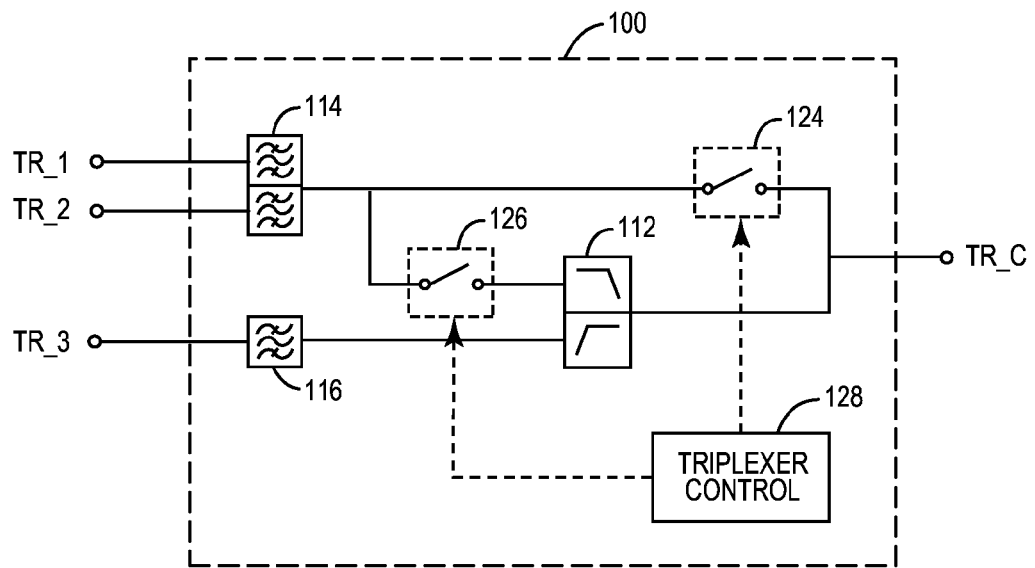
FIGS. 7A-7D are schematic representations illustrating the details of the triplexers shown in FIGS. 4 and 5 according to an additional embodiment of the present disclosure.

FIG. 7A shows details of the first triplexer 100A and the second triplexer 100B according to an additional embodiment of the present disclosure. The triplexer shown in FIG. 7A is substantially similar to that shown in FIG. 6A, except that the triplexer shown in FIG. 7A further includes a first triplexer selection switch 124 and a second triplexer selection switch 126. The first triplexer selection switch 124 is coupled between the triplexer common node TR_C and the duplexer 114. The second triplexer selection switch 126 is coupled between the duplexer 114 and the coupling diplexer 112. Triplexer control circuitry 128 may be provided in order to control the first triplexer selection switch 124 and the second triplexer selection switch 126. In a first mode of operation of the front end circuitry 72 when triplexing functionality is required, the first triplexer selection switch 124 may be opened, and the second triplexer selection switch 126 may be closed, such that the first triplexer 100A and the second triplexer 100B operate as described above. In a second mode of operation of the front end circuitry 72 when triplexing functionality is not required, for example, when the front end circuitry 72 is not operating in a carrier aggregation mode of operation, the first triplexer selection switch 124 may be closed, and the second triplexer selection switch 126 may be opened, such that either or both of the first triplexer 100A and the second triplexer 100B operate as duplexers. Accordingly, the impedance of each one of the first triplexer 100A and the second triplexer 100B as it is presented to the connected one of the antennas 74 may be reduced in certain operating modes, thereby improving the performance of the front end circuitry 72.

According to one embodiment, the first triplexer selection switch 124 and the second triplexer selection switch 126 are located external of the first triplexer 100A and the second triplexer 100B, for example, in the front end switching circuitry 78. Further, the first triplexer selection switch 124 and the second triplexer selection switch 126 may be integrated with additional switching circuitry, such as the antenna swapping circuitry 104. Those of ordinary skill in the art will appreciate that the functionality of the first triplexer selection switch 124 and the second triplexer selection switch 126 may be accomplished in many different switching configurations in the front end circuitry 72, all of which are contemplated herein.

In some embodiments, additional isolation may be provided between the duplexer 114 and the receiver filter 116 externally by one or more switches in the front end switching circuitry 78. For example, one or more switches in the front end switching circuitry 78 may act as a rudimentary phase shifter, which is coupled between the duplexer 114 and the receiver filter 116. Strategically using one or more switches in the front end circuitry 78 to provide isolation between the duplexer 114 and the receiver filter 116 allows for a reduction in area and complexity of the front end circuitry 72.

Figure 7B:
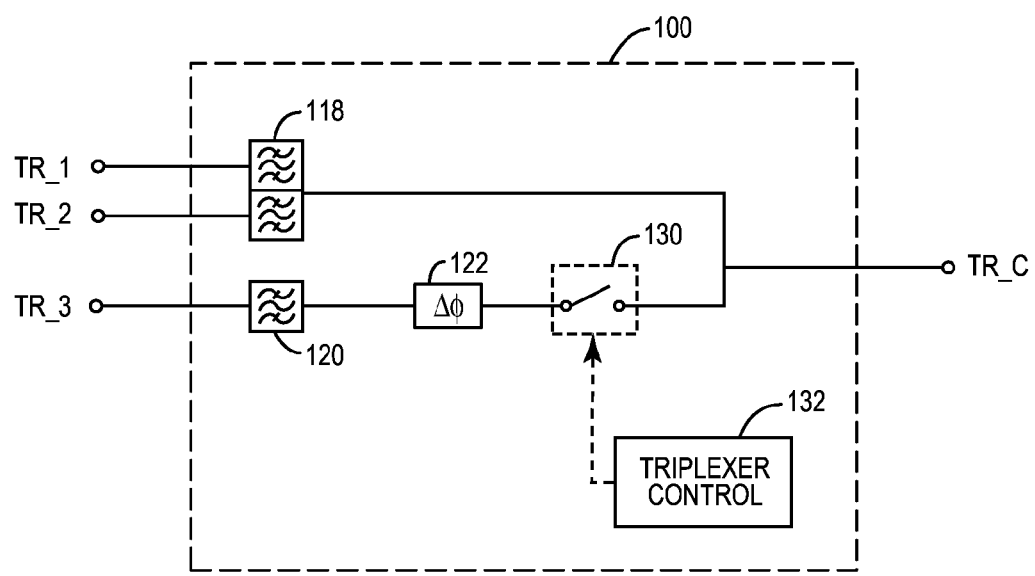

FIG. 7B shows details of the first triplexer 100A and the second triplexer 100B according to an additional embodiment of the present disclosure. The triplexer shown in FIG. 7B is substantially similar to that shown in FIG. 6B, except that the triplexer shown in FIG. 7B further includes a triplexer selection switch 130 between the coupling phase shifter 122 and the triplexer common node TR_C. Triplexer control circuitry 132 may be provided in order to control the triplexer selection switch 130. In a first mode of operation of the front end circuitry 72 when triplexing functionality is required, the triplexer selection switch 130 may be closed, such that the first triplexer 100A and the second triplexer 100B operate as described above. In a second mode of operation of the front end circuitry 72 when triplexing functionality is not required, the triplexer selection switch 130 may be opened, such that the first triplexer 100A and the second triplexer 100B operate as duplexers. Accordingly, the impedance of each one of the first triplexer 100A and the second triplexer 100B as it is presented to the connected one of the antennas 74 is reduced, thereby improving the performance of the front end circuitry 72.

According to one embodiment, the triplexer selection switch 130 may be located external of the first triplexer 100A and the second triplexer 100B, for example, in the front end switching circuitry 78. Further, the triplexer selection switch 130 may be integrated with additional switching circuitry, such as the antenna swapping circuitry 104. Those of ordinary skill in the art will appreciate that the functionality of the triplexer selection switch 130 may be accomplished in many different switching configurations in the front end circuitry 72, all of which are contemplated herein.

In some embodiments, additional isolation may be provided between the duplexer 118 and the receiver filter 120 externally by one or more switches in the front end switching circuitry 78. For example, one or more switches in the front end switching circuitry 78 may act as a rudimentary phase shifter, which is coupled between the duplexer 118 and the receiver filter 120. Strategically using one or more switches in the front end circuitry 78 to provide isolation between the duplexer 118 and the receiver filter 120 allows for a reduction in area and complexity of the front end circuitry 72.

Figure 7C:
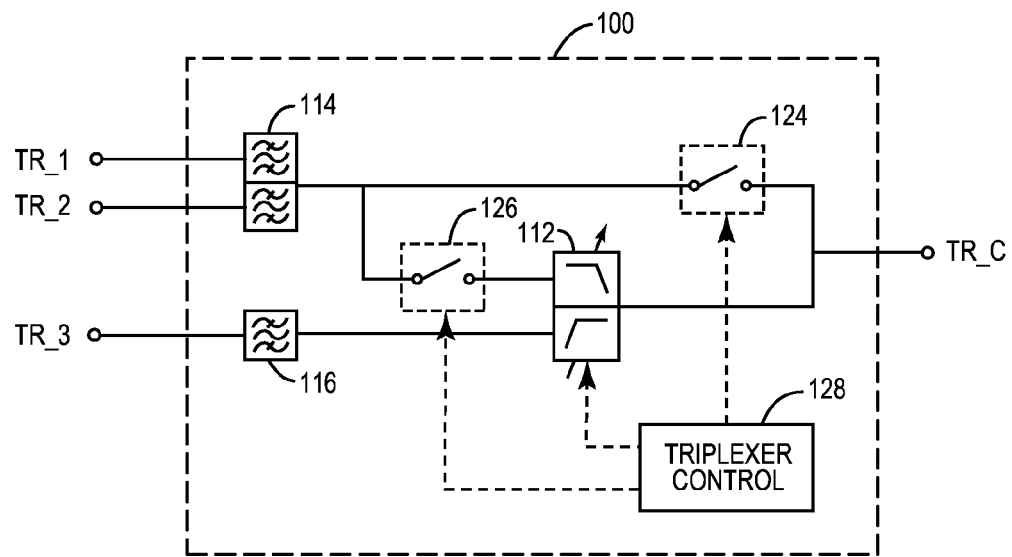

FIG. 7C shows details of the first triplexer 100A and the second triplexer 100B according to an additional embodiment of the present disclosure. The triplexer shown in FIG. 7C is substantially similar to that shown in FIG. 7A, except that the coupling diplexer 112 shown in FIG. 7C is tunable. The triplexer control circuitry 128 may be connected with the coupling diplexer 112 in order to control a filter response thereof. Accordingly, as discussed above, the front end circuitry 72 may maximize isolation between the duplexer 114 and the receiver filter 116, even as conditions in the front end circuitry 72 change.

Figure 7D:
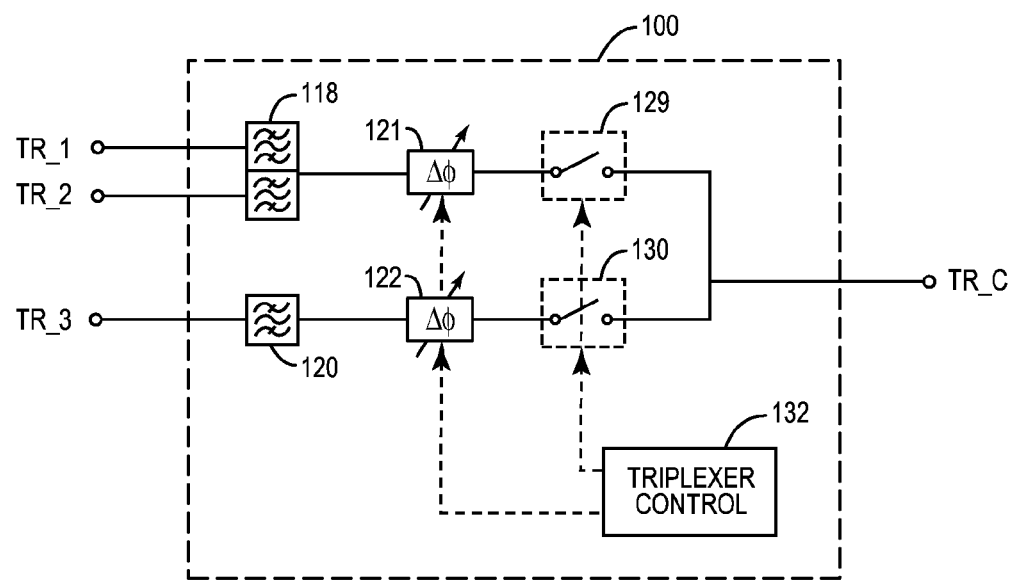

FIG. 7D shows details of the first triplexer 100A and the second triplexer 100B according to an additional embodiment of the present disclosure. The triplexer shown in FIG. 7D is substantially similar to that shown in FIG. 7B, but further includes an additional coupling phase shifter 121 and an additional triplexer selection switch 129. The additional coupling phase shifter 121 and the additional triplexer selection switch 129 are coupled in series between the triplexer common node TR_C and the duplexer 118. Further, the additional coupling phase shifter 121 and the coupling phase shifter 122 are tunable. The triplexer control circuitry 132 is connected to the additional coupling phase shifter 121, the coupling phase shifter 122, and the additional triplexer selection switch 129. Including the additional coupling phase shifter 121 allows for additional isolation between the duplexer 118 and the receiver filter 120. Further, making the additional coupling phase shifter 121 and the coupling phase shifter 122 tunable allows the front end circuitry 72 to maximize isolation between the duplexer 118 and the receiver filter 120, even as conditions in the front end circuitry 72 change. Finally, including the additional triplexer selection switch 129 allows for greater flexibility in the operation of the front end circuitry 72, as both the duplexer 118 and the receiver filter 120 may be used independently of one another if required.

Figure 8:
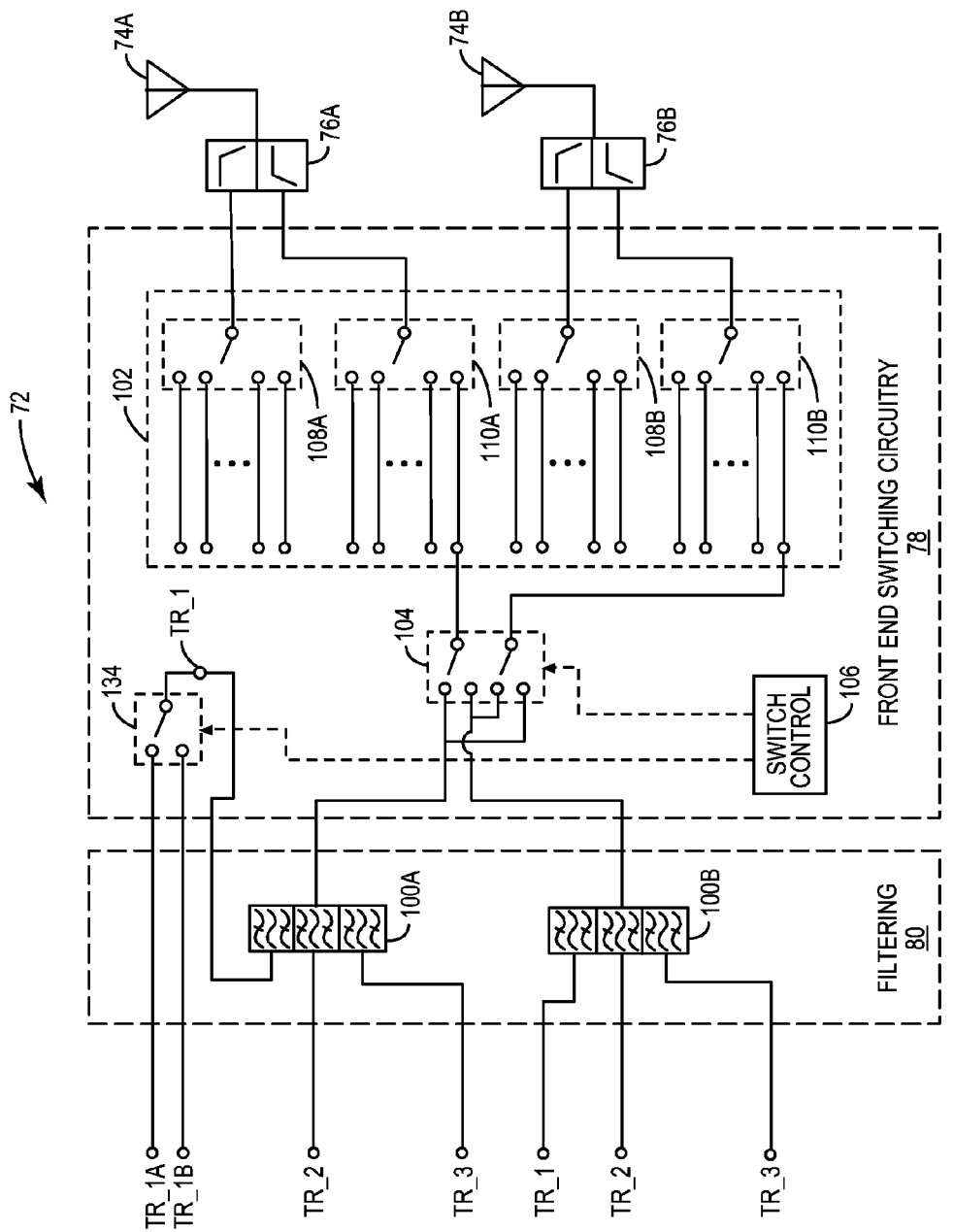
FIG. 8 is a schematic representation of front end circuitry for a mobile terminal capable of operating in one or more carrier aggregations using band-sharing according to one embodiment of the present disclosure.

FIG. 8 shows the front end circuitry 72 according to an additional embodiment of the present disclosure. The front end circuitry 72 shown in FIG. 8 is substantially similar to that shown in FIG. 4, but further includes a band sharing switch 134 coupled between the first power amplifier 88 and the first triplexer 100A. Further, the transceiver circuitry 82 is omitted in FIG. 8 for simplicity. The band sharing switch 134 effectively splits the first triplexer node TR_1 of the first triplexer 100A into a first triplexer sub-node TR_1A and a second triplexer sub-node TR_1B, thereby allowing the first triplexer 100A to support the reception of signals about a third operating band (hereinafter referred to as band C). In this embodiment, the first triplexer 100A is operable in a first mode of operation and a second mode of operation. In the first operating mode of the first triplexer 100A, the band sharing switch 134 couples the first triplexer 100A to the first triplexer sub-node TR_1A, so that band A transmit signals may be delivered from the first triplexer sub-node TR_1A to the front end switching circuitry 78. In the second operating mode of the first triplexer 100A, the band sharing switch 134 couples the first triplexer 100A to the second triplexer sub-node TR_1B, so that band C receive signals may be delivered from the front end switching circuitry 78 to the second triplexer sub-node TR_1B. As will be appreciated by those of ordinary skill in the art, the receive frequency band of band C coincides with the transmit frequency band of band A, thereby allowing the first triplexer 100A to support the transmission and reception of band A signals, the reception of band B signals, and the reception of band C signals. The first triplexer 100A may be further configured to share additional bands, such that one or more of the triplexer nodes of the first triplexer 100A are used to support the transmission or reception of signals about multiple operating bands. Additional switching circuitry may be provided as required to direct a signal at one of the triplexer nodes to an appropriate module in transceiver circuitry (not shown).

The second triplexer 100B may also be configured in a band sharing configuration according to one or more embodiments of the present disclosure, such that additional operating bands are supported by the front end circuitry 72 without additional filters. Additional switching circuitry may be provided as required to direct a signal at one of the triplexer nodes to an appropriate module in the transceiver circuitry (not shown). Accordingly, the performance of the front end circuitry 72 may be improved.

As a specific example, the front end circuitry 72 shown in FIG. 8 may operate in a band 25/band 4/band 1 carrier aggregation configuration, in which band A is band 1, with a transmit frequency range of about 1920 MHz to 1995 MHz and a receive frequency range of about 2110 MHz to 2170 MHz, band B is band 4, with a transmit frequency range of about 1710 MHz to 1755 MHz and a receive frequency range of about 2110 MHz to 2170 MHz, and band C is band 25, with a transmit frequency range of about 1850 MHz to 1915 MHz and a receive frequency range of about 1930 MHz to 1995 MHz.

As will be appreciated by those of ordinary skill in the art, the receive frequency band of band 25 falls within the transmit frequency band of band 1. Accordingly, the first triplexer 100A may be configured to pass both band 1 transmit signals and band 25 receive signals between the triplexer common node TR_C and the first triplexer node TR_1. The band sharing switch 134 may appropriately route the signal from the front end switching circuitry 78 to an appropriate module in the transceiver circuitry (not shown) to facilitate either the transmission of signals about band 1 or the reception of signals about band 25. Those of ordinary skill in the art will further appreciate that the receive frequency band of band 1 falls within the receive frequency band of band 4. The first triplexer 100A may thus be configured to pass both band 1 receive signals and band 4 receive signals between the triplexer common node TR_C and the second triplexer node TR_2, and may further pass band 4 transmit signals between the third triplexer node TR_3 and the triplexer common node TR_C, while attenuating signals outside of the respective bands for each signal path. Additional switching circuitry may be provided to appropriately direct band 1 and band 4 signals at the second triplexer node TR_2 to an appropriate module in the transceiver circuitry (not shown). The second triplexer 100B may be configured to pass band 25 transmit signals between the first triplexer node TR_1 and the triplexer common node TR_C, pass band 25 receive signals between the triplexer common node TR_C and the second triplexer node TR_2, and pass band 1 receive signals and band 4 receive signals between the triplexer common node TR_C and the third triplexer node TR_3, while attenuating signals outside of the respective bands for each signal path. Again, additional switching circuitry may be provided to appropriately direct band 1 and band 4 signals at the third triplexer node TR_3 to an appropriate module in the transceiver circuitry (not shown). Accordingly, the front end circuitry 72 may support at least three operating bands without the need for additional filters.

Figure 9:
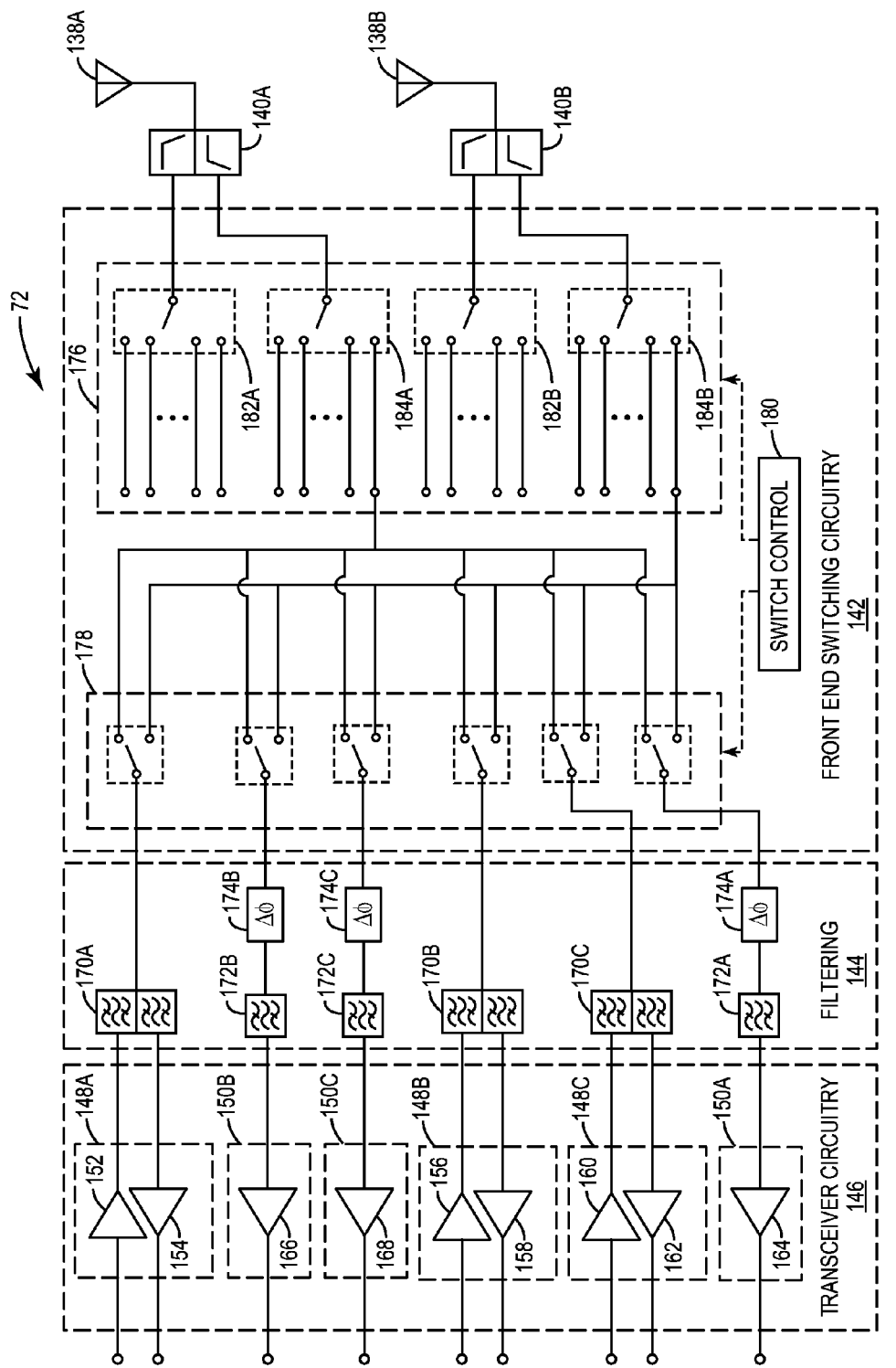
FIG. 9 is a schematic representation of the front end circuitry shown in FIG. 4 according to an additional embodiment of the present disclosure.

FIG. 9 shows the front end circuitry 72 according to an additional embodiment of the present disclosure. The front end circuitry 72 includes a first antenna 138A, a second antenna 138B, a first diplexer 140A, a second diplexer 140B, front end switching circuitry 142, filtering circuitry 144, and transceiver circuitry 146. The transceiver circuitry 146 includes a first transceiver module 148A, a second transceiver module 148B, a third transceiver module 148C, a first receiver module 150A, a second receiver module 150B, and a third receiver module 150C. As will be appreciated by those of ordinary skill in the art, the first transceiver module 148A and the first receiver module 150A may each be associated with a first operating band (hereinafter referred to as band A), such that the first transceiver module 148A is configured to support the transmission and reception of signals about band A, and the first receiver module 150A is configured to support the reception of signals about band A. Similarly, the second transceiver module 148B and the second receiver module 150B may each be associated with a second operating band (hereinafter referred to as band B), such that the second transceiver module 148B is configured to support the transmission and reception of signals about band B, and the second receiver module 150B is configured to support the reception of signals about band B. Finally, the third transceiver module 148C and the third receiver module 150C may each be associated with a third operating band (hereinafter referred to as band C), such that the third transceiver module 148C is configured to support the transmission and reception of signals about band C, and the third receiver module 150C is configured to support the reception of signals about band C.

The first transceiver module 148A may include a first power amplifier 152 and a first LNA 154. The first transceiver module 148A may be configured to receive band A baseband transmit signals at a band A transmit node TX_A, amplify the band A transmit signals to a level appropriate for transmission from the first antenna 138A or the second antenna 138B using the first power amplifier 152, and deliver the amplifier band A transmit signals to the front end switching circuitry 142 through the filtering circuitry 144. The first transceiver module 148A may be further configured to receive band A receive signals at the first LNA 154 through the filtering circuitry 144, amplify the band A receive signals using the first LNA 154, and deliver the amplified band A receive signals to a band A receive node RX_A for further processing, for example, by baseband circuitry (not shown).

Similar to the first transceiver module 148A, the second transceiver module 148B includes a second power amplifier 156 and a second LNA 158. The second transceiver module 148B may be configured to receive band B baseband transmit signals at a band B transmit node TX_B, amplify the band B baseband transmit signals to a level appropriate for transmission from one of the first antenna 138A or the second antenna 138B using the second power amplifier 156, and deliver the amplified band B transmit signals to the front end switching circuitry 142 through the filtering circuitry 144. The second transceiver module 148B may be further configured to receive band B receive signals at the second LNA 158 through the filtering circuitry 144, amplify the band B receive signals using the second LNA 158, and deliver the amplified band B receive signals to a band B receive node RX_B for further processing, for example, by baseband circuitry (not shown).

Similar to the first transceiver module 148A and the second transceiver module 148B, the third transceiver module 148C includes a third power amplifier 160 and a third LNA 162. The third transceiver module 148C may be configured to receive band C baseband transmit signals at a band C transmit node TX_C, amplify the band C baseband transmit signals to a level appropriate for transmission from one of the first antenna 138A or the second antenna 138B using the third power amplifier 160, and deliver the amplified band C transmit signals to the front end switching circuitry 142 through the filtering circuitry 144. The second transceiver module 148B may be further configured to receive band C receive signals at the third LNA 162 through the filtering circuitry 144, amplify the band C receive signals using the third LNA 162, and deliver the amplified band C receive signals to a band C receive node RX_C for further processing, for example, by baseband circuitry (not shown).

The front end circuitry 72 may be configured to operate in one or more carrier aggregation modes of operation. Accordingly, the first receiver module 150A, the second receiver module 150B, the third receiver module 150C, and the filtering circuitry 144 are provided. The first receiver module 150A may include a first receiver LNA 164. The first receiver module 150A may be configured to receive band A receive signals from the front end switching circuitry 142 at the first receiver LNA 164, amplify the band A receive signals using the first receiver LNA 164, and deliver the amplified band A receive signals to a second band A receive node RX_A1 for further processing, for example, by baseband circuitry (not shown). Similarly, the second receiver module 150B may include a second receiver LNA 166. The second receiver module 150B may be configured to receive band B receive signals from the front end switching circuitry 142 at the second receiver LNA 166, amplify the band B receive signals using the second receiver LNA 166, and deliver the amplified band B receive signals to a second band B receive node RX_B1 for further processing, for example, by baseband circuitry (not shown). Finally, the third receiver module 150C may include a third receiver LNA 168. The third receiver module 150C may be configured to receive band C receive signals from the front end switching circuitry 142 at the third receiver LNA 168, amplify the band C receive signals using the third receiver LNA 168, and deliver the amplified band C receive signals to a second band C receive node RX_C1 for further processing, for example, by baseband circuitry (not shown).

The filtering circuitry 144 may include a first duplexer 170A, a second duplexer 170B, a third duplexer 170C, a first receiver filter 172A and first receiver phase shifter 174A, a second receiver filter 172B and second receiver phase shifter 174B, and a third receiver filter 172C and third receiver phase shifter 174C. The first duplexer 170A may be coupled between the first transceiver module 148A and the front end switching circuitry 142, and may isolate band A transmit signals and band A receive signals, delivering band A transmit signals from the first power amplifier 152 to the front end switching circuitry 142 and delivering band A receive signals from the front end switching circuitry 142 to the first LNA 154, while attenuating signals outside of the bands of the respective signal paths. The second duplexer 170B may be coupled between the second transceiver module 148B and the front end switching circuitry 142, and may isolate band B transmit signals and band B receive signals, delivering band B transmit signals from the second power amplifier 156 to the front end switching circuitry 142 and delivering band B receive signals from the front end switching circuitry 142 to the second LNA 158, while attenuating signals outside of the bands of the respective signal paths. The third duplexer 170C may be coupled between the third transceiver module 148C and the front end switching circuitry 142, and may isolate band C transmit signals and band C receive signals, delivering band C transmit signals from the third power amplifier 160 to the front end switching circuitry 142 and delivering band C receive signals from the front end switching circuitry 142 to the third LNA 162, while attenuating signals outside of the bands of the respective signal paths.

The first receiver filter 172A and the first receiver phase shifter 174A may be coupled in series between the first receiver module 150A and the front end switching circuitry 142, and may isolate band A receive signals, delivering band A receive signals from the front end switching circuitry 142 to the first receiver LNA 164, while attenuating other signals. The second receiver filter 172B and the second receiver phase shifter 174B may be coupled in series between the second receiver module 150B and the front end switching circuitry 142, and may isolate band B receive signals, delivering band B receive signals from the front end switching circuitry 142 to the second receiver LNA 166, while attenuating other signals. The third receiver filter 172C and the third receiver phase shifter 174C may be coupled between the third receiver module 150C and the front end switching circuitry 142, and may isolate band C receive signals, delivering band C receive signals from the front end switching circuitry 142 to the third receiver LNA 168, while attenuating other signals.

The front end switching circuitry 142 may include band selection circuitry 176, triplexer switching and antenna swapping circuitry 178, and switching control circuitry 180. The band selection circuitry 176 may include low-band selection circuitry 182 and mid/high-band selection circuitry 184 for each one of the first antenna 138A and the second antenna 138B. Specifically, the band selection circuitry 176 may include first low-band selection circuitry 182A coupled to the first antenna 138A through the first diplexer 140A, first mid/high-band selection circuitry 184A coupled to the first antenna 138A through the first diplexer 140A, second low-band selection circuitry 182B coupled to the second antenna 138B through the second diplexer 140B, and second mid/high-band selection circuitry 184B coupled to the second antenna 138B through the second diplexer 140B. Each one of the diplexers 140 may be configured to pass low-band signals between the connected low-band selection circuitry 182 and the connected one of the antennas 138, pass mid/high-band signals between the connected mid/high-band selection circuitry 184 and the connected one of the antennas 138, and attenuate signals outside of the respective low and mid/high bands while providing isolation between the connected low-band selection circuitry 182 and mid/high-band selection circuitry 184. The band selection circuitry 176 may be configured to place one or more modules in the transceiver circuitry 146 in contact with the first antenna 138A or the second antenna 138B in order to transmit and receive signals about the operating bands associated with one or more transceiver modules.

The triplexer switching and antenna swapping circuitry 178 may be coupled between the filtering circuitry 144 and the band selection circuitry 176, and may serve multiple functions in the front end circuitry 72. First, the triplexer switching and antenna swapping circuitry 178 may couple one of the duplexers 170 and one of the receiver filters 172 together to form a first triplexer, which is in turn coupled to one of the first antenna 138A or the second antenna 138B, as explained in further detail below. The triplexer switching and antenna swapping circuitry 178 may further couple a different one of the duplexers 170 and a different one of the receiver filters 172 together to form a second triplexer, which is in turn coupled to a different one of the first antenna 138A or the second antenna 138B, as explained in further detail below. Further, the triplexer switching and antenna swapping circuitry 178 may swap antennas between the first triplexer and the second triplexer in order to ensure that signals are transmitted using the one of the antennas 138 with the most favorable transmission characteristics at the time.

Specifically, the switching control circuitry 180 may operate the band selection circuitry 176 and the triplexer switching and antenna swapping circuitry 178. In a first operating mode of the front end switching circuitry 142, the switching control circuitry 180 may operate the band selection circuitry 176 and the triplexer switching and antenna swapping circuitry 178 to place the first transceiver module 148A and the second receiver module 150B in contact with the first antenna 138A through the filtering circuitry 144, and place the second transceiver module 148B and the first receiver module 150A in contact with the second antenna 138B through the filtering circuitry 144. In this configuration, the first duplexer 170A and the second receiver filter 172B effectively form a first triplexer, while the second duplexer 170B and the first receiver filter 172A effectively form a second triplexer. Accordingly, the front end circuitry 72 may simultaneously transmit band A signals while receiving band A signals and band B signals from the first antenna 138A, and simultaneously receive band A signals and band B signals from the second antenna 138B. Alternatively in this configuration, the front end circuitry 72 may simultaneously transmit band B signals while receiving band A signals and band B signals from the second antenna 138B, and simultaneously receive band A signals and band B signals from the first antenna 138A.

In a second operating mode of the front end switching circuitry 142, the switching control circuitry 180 may operate the band selection circuitry 176 and the triplexer switching and antenna swapping circuitry 178 to place the first transceiver module 148A and the second receiver module 150B in contact with the second antenna 138B through the filtering circuitry 144, and place the second transceiver module 148B and the first receiver module 150A in contact with the first antenna 138A through the filtering circuitry 144. In this configuration, once again the first duplexer 170A and the second receiver filter 172B effectively form a first triplexer, while the second duplexer 170B and the first receiver filter 172A effectively form a second triplexer. Accordingly, the front end circuitry 72 may simultaneously transmit band A signals while receiving band A signals and band B signals from the second antenna 138B, and simultaneously receive band A signals and band B signals from the first antenna 138A. Alternatively in this configuration, the front end circuitry 72 may simultaneously transmit band B signals while receiving band B signals and band A signals from the first antenna 138A, and simultaneously receive band A signals and band B signals from the second antenna 138B.

In a third operating mode of the front end switching circuitry 142, the switching control circuitry 180 may operate the band selection circuitry 176 and the triplexer switching and antenna swapping circuitry 178 to place the first transceiver module 148A and the third receiver module 150C in contact with the first antenna 138A through the filtering circuitry 144, and place the third transceiver module 148C and the first receiver module 150A in contact with the second antenna 138B through the filtering circuitry 144. In this configuration, the first duplexer 170A and the third receiver filter 172C effectively form a first triplexer, while the third duplexer 170C and the first receiver filter 172A effectively form a second triplexer. Accordingly, the front end circuitry 72 may simultaneously transmit band A signals while receiving band A signals and band C signals from the first antenna 138A, and simultaneously receive band A and band C signals from the second antenna 138B. Alternatively in this configuration, the front end circuitry 72 may simultaneously transmit band C signals while receiving band C signals and band A signals from the second antenna 138B, and simultaneously receive band A and band C signals from the first antenna 138A.

In a fourth operating mode of the front end switching circuitry 142, the switching control circuitry 180 may operate the band selection circuitry 176 and the triplexer switching and antenna swapping circuitry 178 to place the first transceiver module 148A and the third receiver module 150C in contact with the second antenna 138B through the filtering circuitry 144, and place the third transceiver module 148C and the first receiver module 150A in contact with the first antenna 138A through the filtering circuitry 144. In this configuration, once again the first duplexer 170A and the third receiver filter 172C effectively form a first triplexer, while the third duplexer 170C and the first receiver filter 172A effectively form a second triplexer. Accordingly, the front end circuitry 72 may simultaneously transmit band A signals while receiving band A signals and band C signals from the second antenna 138B, and simultaneously receive band A and band C signals from the first antenna 138A. Alternatively in this configuration, the front end circuitry 72 may simultaneously transmit band C signals while receiving band C signals and band A signals from the first antenna 138A, and simultaneously receive band A and band C signals from the second antenna 138B.

In a fifth operating mode of the front end switching circuitry 142, the switching control circuitry 180 may operate the band selection circuitry 176 and the triplexer switch-ing and antenna swapping circuitry 178 to place the second transceiver module 148B and the third receiver module 150C in contact with the first antenna 138A through the filtering circuitry 144, and place the third transceiver module 148C and the second receiver module 150B in contact with the second antenna 138B through the filtering circuitry 144. In this configuration, the second duplexer 170B and the third receiver filter 172C effectively form a first triplexer, while the third duplexer 170C and the second receiver filter 172B effectively form a second triplexer. Accordingly, the front end circuitry 72 may simultaneously transmit band B signals while receiving band B signals and band C signals from the first antenna 138A, and simultaneously receive band B signals and band C signals from the second antenna 138B. Alternatively in this configuration, the front end circuitry 72 may simultaneously transmit band C signals while receiving band C signals and band B signals from the second antenna 138B, and simultaneously receive band B signals and band C signals from the first antenna 138A.

In a sixth operating mode of the front end switching circuitry 142, the switching control circuitry 180 may operate the band selection circuitry 176 and the triplexer switching and antenna swapping circuitry 178 to place the second transceiver module 148B and the third receiver module 150C in contact with the second antenna 138B through the filtering circuitry 144, and place the third transceiver module 138C and the second receiver module 150B in contact with the first antenna 138A through the filtering circuitry 144. In this configuration, once again the second duplexer 170B and the third receiver filter 172C effectively form a first triplexer, while the third duplexer 170C and the second receiver filter 172B effectively form a second triplexer. Accordingly, the front end circuitry 72 may simultaneously transmit band B signals while receiving band B signals and band C signals from the second antenna 138B, and simultaneously receive band B signals and band C signals from the first antenna 138A. Alternatively in this configuration, the front end circuitry 72 may simultaneously transmit band C signals while receiving band C signals and band B signals from the first antenna 138A, and simultaneously receive band B signals and band C signals from the second antenna 138B.

By using the triplexer switching and antenna swapping circuitry 178 to effectively form a first triplexer and a second triplexer in order to isolate the signals paths within the transceiver circuitry 146, the front end circuitry 72 may support one or more carrier aggregation configurations while also reducing the load connected to the one of the antennas 138 used for transmission of signals. That is, the load seen by the one of the antennas 138 used for transmission of signals in the front end circuitry 72 is limited to the load provided by one of the duplexers 170 and one of the receiver filters 172, which is substantially lower than the load provided by a quadplexer, as used in conventional front end solutions. Accordingly, the performance of the front end circuitry 72 is improved.

The front end circuitry 72 may operate in a variety of carrier aggregation configurations. For example, the front end circuitry 72 may operate in a mid-band/mid-band carrier aggregation configuration, in which band A, band B, and band C are different mid-band operating bands. As an additional example, the front end circuitry 72 may operate in a mid-band/high-band carrier aggregation configuration, in which one or more of band A, band B, or band C is a mid-band operating band and the remaining bands are a high-band operating band. Alternatively, the front end circuitry 72 may operate in a high-band/high-band carrier aggregation configuration, in which band A, band B, and band C are different high-band operating bands. In additional embodiments where the triplexer selection and antenna swapping circuitry 178 is coupled to low-band selection circuitry 182 in the band selection circuitry 176, the front end circuitry 72 may operate in a low-band/low-band carrier aggregation configuration, in which band A, band B, and band C are different low-band operating bands. Additionally, if the triplexer selection and antenna swapping circuitry 178 is coupled to one of the antennas 138 via the associated low-band selection circuitry 182 and the other antenna 138 via the associated mid/high-band selection circuitry 184, the front end circuitry 72 may operate in a low-band/mid-band or low-band/high-band carrier aggregation configuration, in which one or more of band A, band B, and band C is a low-band operating band and the remaining bands are mid/high-band operating bands.

Although the front end switching circuitry 142 is shown in a particular configuration for purposes of illustration, those of ordinary skill in the art will appreciate that a variety of configurations for the front end switching circuitry 142 may be used without departing from the principles of the present disclosure. For example, the band selection circuitry 176, the triplexer switching and antenna swapping circuitry 178, or both, may include more or less switching elements, and may be arranged in alternative configurations without departing from the principles of the present disclosure. Further, although only three transceiver modules 148 and three receiver modules 150 are shown in the transceiver circuitry 146 for purposes of illustration, those of ordinary skill in the art will appreciate that additional transceiver modules, additional receiver modules, and other additional circuitry may be included in the transceiver circuitry 146 without departing from the principles of the present disclosure.

Figure 10:
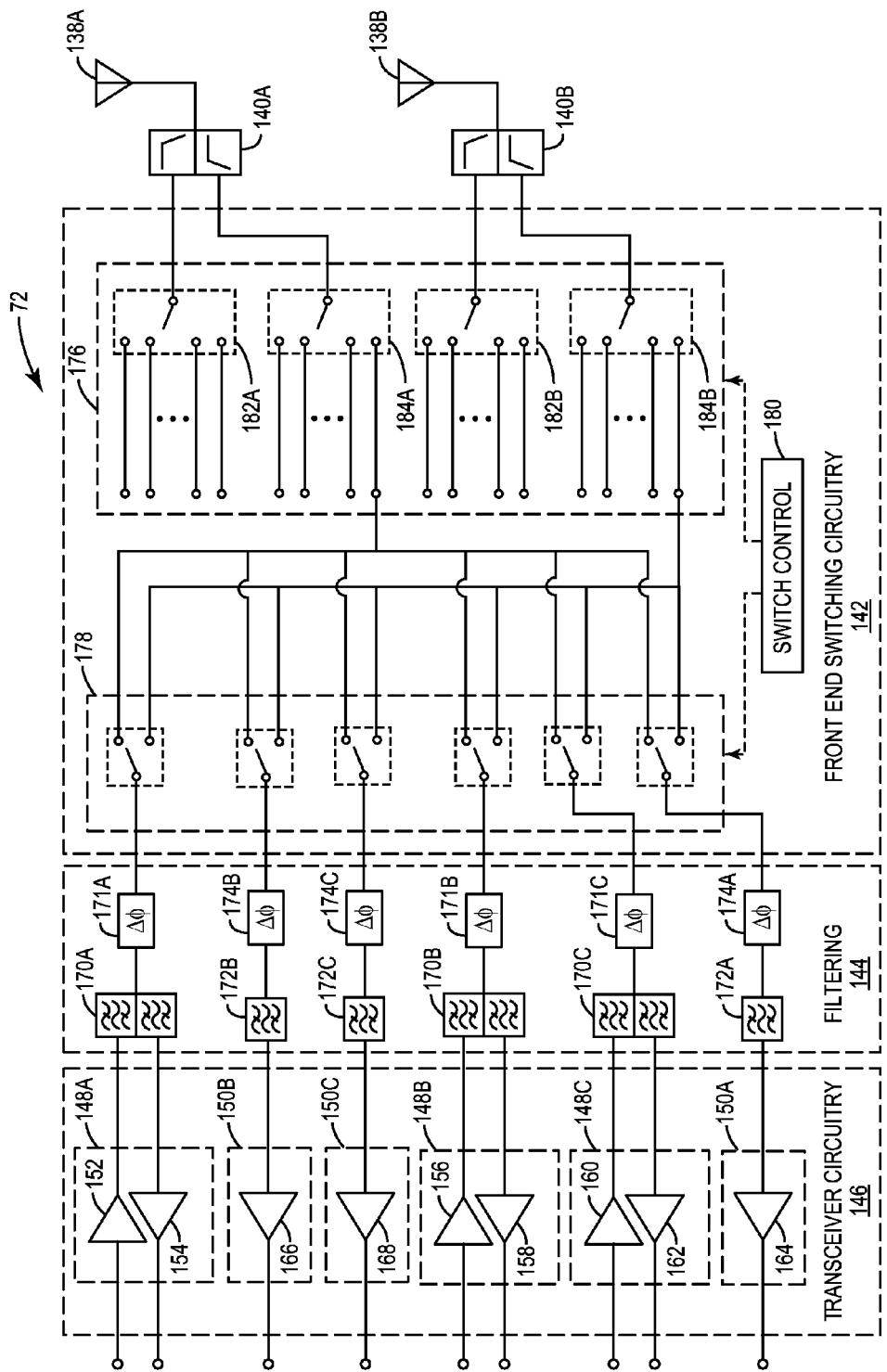
FIG. 10 is a schematic representation of the front end circuitry shown in FIG. 4 according to an additional embodiment of the present disclosure.

FIG. 10 shows the front end circuitry 72 according to an additional embodiment of the present disclosure. The front end circuitry 72 shown in FIG. 10 is substantially similar to that shown in FIG. 9, but further includes a first phase shifter 171A coupled between the first duplexer 170A and the front end switching circuitry 142, a second phase shifter 171B coupled between the second duplexer 170B and the front end switching circuitry 142, and a third phase shifter 171C coupled between the third duplexer 170C and the front end switching circuitry 142. The first phase shifter 171A, the second phase shifter 171B, and the third phase shifter 171C may provide additional isolation between the duplexer 170 coupled to the phase shifter 171 and the receiver filter 172 connected to the duplexer 170 via the front end switching circuitry 142. As discussed above, the first phase shifter 171A, the second phase shifter 171B, the third phase shifter 171C, the first receiver phase shifter 174A, the second receiver phase shifter 174B, and the third receiver phase shifter 174C may be provided to isolate the respective duplexer 170 from the receiver filter 172 with which it is connected via the front end switching circuitry 142. Accordingly, the first phase shifter 171A, the second phase shifter 171B, the third phase shifter 171C, the first receiver phase shifter 174A, the second receiver phase shifter 174B, and the third receiver phase shifter 174C may be tunable in order to maximize isolation between the respective duplexer 170 and receiver filter 172 with which the duplexer 170 is connected, even as conditions in the front end circuitry 72 change. Filtering control circuitry (not shown) may be included in order to tune the response of each one of the phase shifters to maximize isolation between the respective duplexer 170 and the receiver filter 172 with which the duplexer 170 is connected.

Those skilled in the art will recognize improvements and modifications to the embodiments of the present disclosure. All such improvements and modifications are considered within the scope of the concepts disclosed herein and the claims that follow.

What is claimed is:

1. Front end circuitry comprising:
a first antenna node;
a second antenna node;
a first triplexer;
a second triplexer; and
front end switching circuitry coupled between the first antenna node, the second antenna node, the first triplexer, and the second triplexer, and configured to selectively couple the first triplexer to one of the first antenna node and the second antenna node, and couple the second triplexer to a different one of the first antenna node and the second antenna node, wherein each one of the first triplexer and the second triplexer comprises:
a first triplexer node, a second triplexer node, a third triplexer node, and a common triplexer node;
a coupling diplexer coupled to the common triplexer node;
a duplexer coupled between the first triplexer node, the second triplexer node, and the coupling diplexer, such that the duplexer connects to the common triplexer node through the coupling diplexer; and
a receiver filter coupled between the third triplexer node and the coupling diplexer, such that the receiver filter connects to the common triplexer node through the coupling diplexer.

2. The front end circuitry of claim 1 wherein the common triplexer node is coupled to the front end switching circuitry.

3. The front end circuitry of claim 1 wherein:
the duplexer of the first triplexer is configured to isolate signals about a first operating band, delivering transmit signals about the first operating band from the first triplexer node of the first triplexer to the triplexer common node of the first triplexer and delivering receive signals about the first operating band from the triplexer common node of the first triplexer to the second triplexer node of the first triplexer, while attenuating other signals;
the receiver filter of the first triplexer is configured to isolate signals about a second operating band, delivering receive signals about the second operating band from the triplexer common node of the first triplexer to the third triplexer node of the first triplexer, while attenuating other signals; and
the coupling diplexer of the first triplexer is configured to isolate the duplexer of the first triplexer from the receiver filter of the first triplexer.

4. The front end circuitry of claim 3 wherein:
the duplexer of the second triplexer is configured to isolate signals about the second operating band, delivering transmit signals about the second operating band from the first triplexer node of the second triplexer to the common triplexer node of the second triplexer and delivering receive signals about the second operating band from the triplexer common node of the second triplexer to the second triplexer node of the second triplexer, while attenuating other signals;
the receiver filter of the second triplexer is configured to isolate signals about a first operating band, delivering receive signals about the first operating band from the triplexer common node of the second triplexer to the third triplexer node of the second triplexer, while attenuating other signals; and the coupling diplexer of the second triplexer is configured to isolate the duplexer of the second triplexer from the receiver filter of the second triplexer.

5. The front end circuitry of claim 4 wherein the first operating band and the second operating band are low-band operating bands with a transmit and receive frequency range within the low-band frequency range of about 600 MHz to 1 GHz.

6. The front end circuitry of claim 4 wherein the first operating band and the second operating band are mid-band operating bands with a transmit and receive frequency range within the mid-band frequency range of about 1.7 GHz to 2.2 GHz.

7. The front end circuitry of claim 4 wherein the first operating band and the second operating band are high-band operating bands with a transmit and receive frequency range within the high-band frequency range of about 2.3 GHz to 2.5 GHz.

8. The front end circuitry of claim 4 wherein:
the first operating band is a mid-band operating band with a transmit and receive frequency range within the mid-band frequency range of about 1.7 GHz to 2.2 GHz; and
the second operating band is a high-band operating band with a transmit and receive frequency range within the high-band frequency range of about 2.3 GHz to 2.5 GHz.

9. The front end circuitry of claim 4 further comprising:
a first power amplifier coupled to the first triplexer node of the first triplexer;
a first low noise amplifier coupled to the second triplexer node of the first triplexer; and
a first receiver low noise amplifier coupled to the third triplexer node of the first triplexer.

10. The front end circuitry of claim 9 wherein:
the first power amplifier is configured to receive and amplify baseband transmit signals about the first operating band and deliver the amplified baseband transmit signals to the front end switching circuitry through the first triplexer;
the first low noise amplifier is configured to receive and amplify receive signals about the first operating band for further processing by the front end circuitry; and
the first receiver low noise amplifier is configured to receive and amplify receive signals about the second operating band for further processing by the front end circuitry.

11. The front end circuitry of claim 9 further comprising:
a second power amplifier coupled to the first triplexer node of the second triplexer;
a second low noise amplifier coupled to the second triplexer node of the second triplexer; and
a second receiver low noise amplifier coupled to the third triplexer node of the second triplexer.

12. The front end circuitry of claim 11 wherein:
the first power amplifier is configured to receive and amplify the baseband transmit signals about the first operating band and deliver the amplified baseband transmit signals to the front end switching circuitry through the first triplexer;
the first low noise amplifier is configured to receive signals about the first operating band from the first triplexer, and amplify the received signals for further processing by the front end circuitry;

the first receiver low noise amplifier is configured to receive signals about the second operating band from the first triplexer, and amplify the received signals for further processing by the front end circuitry;
the second power amplifier is configured to receive and amplify baseband transmit signals about the second operating band and deliver the amplified baseband transmit signals to the front end switching circuitry through the second triplexer;
the second low noise amplifier is configured to receive signals about the second operating band from the second triplexer, and amplify the received signals for further processing by the front end circuitry; and
the second receiver low noise amplifier is configured to receive signals about the first operating band from the second triplexer, and amplify the received signals for further processing by the front end circuitry.

13. The front end circuitry of claim 1 wherein each one of the first triplexer and the second triplexer comprises:
a first triplexer node, a second triplexer node, a third triplexer node, and a common triplexer node;
a duplexer and a phase shifter coupled between the first triplexer node, the second triplexer node, and the common triplexer node; and
a receiver filter and a receiver phase shifter coupled between the third triplexer node and the common triplexer node.

14. The front end circuitry of claim 13 wherein the phase shifter and the receiver phase shifter are tunable.

15. The front end circuitry of claim 14 wherein the front end circuitry is configured to tune the phase shifter and the receiver phase shifter in order to maximize the isolation between the duplexer and the receiver filter.

16. The front end circuitry of claim 13 wherein the common triplexer node is coupled to the front end switching circuitry.

17. The front end circuitry of claim 13 wherein:
the duplexer of the first triplexer is configured to isolate signals about a first operating band, delivering transmit signals about the first operating band from the first triplexer node of the first triplexer to the common triplexer node of the first triplexer and delivering receive signals about the first operating band from the common node of the first triplexer to the second triplexer node of the first triplexer, while attenuating other signals;
the receiver filter of the first operating band is configured to isolate signals about a second operating band, delivering receive signals about the second operating band from the triplexer common node of the first triplexer to the third triplexer node of the first triplexer, while attenuating other signals; and
the coupling phase shifter of the first triplexer is configured to isolate the duplexer of the first triplexer from the receiver filter of the first triplexer.

18. The front end circuitry of claim 17 wherein:
the duplexer of the second triplexer is configured to isolate signals about the second operating band, delivering transmit signals about the second operating band from the first triplexer node of the second triplexer to the common triplexer node of the second triplexer and delivering receive signals about the second operating band from the common triplexer node of the second triplexer to the second triplexer node of the second triplexer, while attenuating other signals;
the receiver filter is configured to isolate signals about the first operating band, delivering receive signals about the first operating band from the common triplexer node of the second triplexer to the third triplexer node of the second triplexer, while attenuating other signals; and the coupling phase shifter of the second triplexer is configured to isolate the duplexer of the second triplexer from the receiver filter of the second triplexer.

19. The front end circuitry of claim 18 wherein the first operating band and the second operating band are low-band operating bands with a transmit and receive frequency range within the low-band frequency range of about 600 MHz to 1 GHz.

20. The front end circuitry of claim 18 wherein the first operating band and the second operating band are mid-band operating bands with a transmit and receive frequency range within the mid-band frequency range of about 1.7 GHz to 2.2 GHz.

21. The front end circuitry of claim 18 wherein the first operating band and the second operating band are high-band operating bands with a transmit and receive frequency range within the high-band frequency range of about 2.3 GHz to 2.5 GHz.

22. The front end circuitry of claim 18 wherein:
the first operating band is a mid-band operating band with a transmit and receive frequency range within the mid-band frequency range of about 1.7 GHz to 2.2 GHz; and
the second operating band is a high-band operating band with a transmit and receive frequency range within the high-band frequency range of about 2.3 GHz to 2.5 GHz.

23. The front end circuitry of claim 18 further comprising:
a first power amplifier coupled to the first triplexer node of the first triplexer;
a first low noise amplifier coupled to the second triplexer node of the first triplexer; and
a first receiver low noise amplifier coupled to the third triplexer node of the first triplexer.

24. The front end circuitry of claim 23 wherein:
the first power amplifier is configured to receive and amplify baseband transmit signals about the first operating band and deliver the amplified transmit signals to the front end switching circuitry through the first triplexer;
the first low noise amplifier is configured to receive and amplify receive signals about the first operating band for further processing by the front end circuitry; and
the first receiver low noise amplifier is configured to receive and amplify receive signals about the second operating band for further processing by the front end circuitry.

25. The front end circuitry of claim 23 further comprising:
a second power amplifier coupled to the first triplexer node of the second triplexer;
a second low noise amplifier coupled to the second triplexer node of the second triplexer; and
a second receiver low noise amplifier coupled to the third triplexer node of the second triplexer.

26. The front end circuitry of claim 25 wherein:
the first power amplifier is configured to receive and amplify baseband transmit signals about the first operating band and deliver the amplified baseband transmit signals to the front end switching circuitry through the first triplexer;
the first low noise amplifier is configured to receive signals about the first operating band from the first triplexer, and amplify the received signals for further processing by the front end circuitry;
the first receiver low noise amplifier is configured to receive signals about the second operating band from the first triplexer, and amplify the received signals for further processing by the front end circuitry;
the second power amplifier is configured to receive and amplify baseband transmit signals about the second operating band and deliver the amplified transmit signals to the front end switching circuitry through the second triplexer;
the second low noise amplifier is configured to receive signals about the second operating band from the second triplexer, and amplify the received signals for further processing by the front end circuitry; and
the second receiver low noise amplifier is configured to receive signals about the first operating band from the second triplexer, and amplify the received signals for further processing by the front end circuitry.

27. The front end circuitry of claim 1 further comprising transceiver circuitry coupled to the first triplexer and the second triplexer, such that the first triplexer and the second triplexer are coupled between the front end switching circuitry and the transceiver circuitry.

28. The front end circuitry of claim 27 wherein:
the first triplexer is configured to:
pass transmit signals about a first operating band between the transceiver circuitry and the front end circuitry, while attenuating other signals;
pass receive signals about the first operating band between the front end switching circuitry and the transceiver circuitry, while attenuating other signals; and
pass receive signals about a second operating band between the front end switching circuitry and the transceiver circuitry, while attenuating other signals;
the second triplexer is configured to:
pass transmit signals about the second operating band between the transceiver circuitry and the front end circuitry, while attenuating other signals;
pass receive signals about the second operating band between the front end switching circuitry and the transceiver circuitry, while attenuating other signals; and
pass receive signals about the first operating band between the front end switching circuitry and the transceiver circuitry, while attenuating other signals.

29. The front end circuitry of claim 28 wherein the first operating band and the second operating band are low-band operating bands with a transmit and receive frequency range within the low-band frequency range of about 600 MHz to 1 GHz.

30. The front end circuitry of claim 28 wherein the first operating band and the second operating band are mid-band operating bands with a transmit and receive frequency range within the mid-band frequency range of about 1.7 GHz to 2.2 GHz.

31. The front end circuitry of claim 28 wherein the first operating band and the second operating band are high-band operating bands with a transmit and receive frequency range within the high-band frequency range of about 2.3 GHz to 2.5 GHz.

32. The front end circuitry of claim 28 wherein:
the first operating band is a mid-band operating band with a transmit and receive frequency range within the mid-band frequency range of about 1.7 GHz to 2.2 GHz; and the second operating band is a high-band operating band with a transmit and receive frequency range within the high-band frequency range of about 2.3 GHz to 2.5 GHz.

33. Front end circuitry comprising:
a first antenna node;
a second antenna node;
a plurality of duplexers;
a plurality of receiver filters; and
front end switching circuitry coupled between the first antenna node, the second antenna node, the plurality of duplexers, and the plurality of receiver filters and configured to selectively couple a first one of the plurality of duplexers and a first one of the plurality of receiver filters to one of the first antenna node and the second antenna node, and couple a second one of the plurality of duplexers and a second one of the plurality of receiver filters to a different one of the first antenna node and the second antenna node wherein:
the first one of the plurality of duplexers is configured to isolate signals about a first operating band, delivering transmit signals about the first operating band from the transceiver circuitry to the front end switching circuitry and delivering receive signals about the first operating band from the front end switching circuitry to the transceiver circuitry;
the first one of the plurality of receiver filters is configured to isolate signals about a second operating band, delivering receive signals about the second operating band from the front end switching circuitry to the transceiver circuitry;
the second one of the plurality of duplexers is configured to isolate signals about the second operating band, delivering transmit signals about the second operating band from the transceiver circuitry to the front end switching circuitry and delivering receive signals about the second operating band from the front end switching circuitry to the transceiver circuitry; and
the second one of the plurality of receiver filters is configured to isolate signals about the first operating band, delivering receive signals about the first operating band from the front end switching circuitry to the transceiver circuitry.

34. The front end circuitry of claim 33 wherein:
each one of the plurality of duplexers is coupled in series with a phase shifter; and
each one of the plurality of receiver filters is coupled in series with a receiver phase shifter.

35. The front end circuitry of claim 34 wherein each one of the phase shifters and each one of the receiver phase shifters are tunable.

36. The front end circuitry of claim 35 wherein the front end circuitry is configured to tune the phase shifters and the receiver phase shifters in order to maximize isolation between the first one of the plurality of duplexers and the first one of the plurality of receiver filters and the second one of the plurality of duplexers and the second one of the plurality of receiver filters, respectively.

37. The front end circuitry of claim 33 further including transceiver circuitry coupled to the plurality of duplexers and the plurality of receiver filters, such that the plurality of duplexers and the plurality of receiver filters are coupled between the front end switching circuitry and the transceiver circuitry.

38. The front end circuitry of claim 33 wherein the first operating band and the second operating band are low-band operating bands with a transmit and receive frequency range within the low-band frequency range of about 600 MHz to 1 GHz.

39. The front end circuitry of claim 33 wherein the first operating band and the second operating band are mid-band operating bands with a transmit and receive frequency range within the mid-band frequency range of about 1.7 GHz to 2.2 GHz.

40. The front end circuitry of claim 33 wherein the first operating band and the second operating band are high-band operating bands with a transmit and receive frequency range within the high-band frequency range of about 2.3 GHz to 2.5 GHz.

41. The front end circuitry of claim 33 wherein:
the first operating band is a mid-band operating band with a transmit and receive frequency range within the mid-band frequency range of about 1.7 GHz to 2.2 GHz; and
the second operating band is a high-band operating band with a transmit and receive frequency range within the high-band frequency range of about 2.3 GHz to 2.5 GHz.

* * * * *